(12) United States Patent
Chalupsky

(10) Patent No.: US 12,129,651 B1
(45) Date of Patent: Oct. 29, 2024

(54) UTILITY PARTITION DEVICE AND SYSTEM(s)

(71) Applicant: Chad Allen Chalupsky, Parker, CO (US)

(72) Inventor: Chad Allen Chalupsky, Parker, CO (US)

( * ) Notice: Subject to any disclaimer, the term of this patent is extended or adjusted under 35 U.S.C. 154(b) by 0 days.

(21) Appl. No.: 18/435,682

(22) Filed: Feb. 7, 2024

(51) Int. Cl.
 *E04B 9/04* (2006.01)
 *H02G 3/04* (2006.01)

(52) U.S. Cl.
 CPC .......... *E04B 9/0421* (2013.01); *E04B 9/0407* (2013.01); *E04B 9/0464* (2013.01); *H02G 3/04* (2013.01)

(58) Field of Classification Search
 CPC ........ E03F 1/003; F16L 5/00; E04D 13/1625; E04B 9/0421
 USPC ............................................. 52/220.1–220.8
 See application file for complete search history.

(56) References Cited

U.S. PATENT DOCUMENTS

| | | | |
|---|---|---|---|
| 2,602,764 A | | 7/1952 | Billingham |
| 2,692,019 A | | 10/1954 | Zalkind et al. |
| 3,482,505 A | | 12/1969 | Sawyer et al. |
| 4,545,166 A | | 10/1985 | Kielmeyer |
| 4,559,752 A | | 12/1985 | Kieffer |
| 5,890,838 A | * | 4/1999 | Moore, Jr. ............... E03F 1/003 405/49 |
| 6,487,825 B1 | | 12/2002 | Sillik |
| 6,739,104 B2 | | 5/2004 | Tokonabe et al. |
| 7,803,466 B2 | | 9/2010 | Dorsy |
| 7,806,627 B2 | * | 10/2010 | DiTullio .................. E03F 1/003 405/49 |
| 8,065,853 B2 | | 11/2011 | Tonyan et al. |
| 8,084,141 B2 | | 12/2011 | Dorsy |
| 8,555,574 B2 | * | 10/2013 | Certuse, Jr. ........... F16L 59/121 52/407.3 |
| 8,558,113 B2 | * | 10/2013 | Krietzman ............. H02G 3/045 174/72 A |
| 9,512,670 B2 | | 12/2016 | Forbis et al. |
| 9,528,273 B1 | | 12/2016 | Harkins |
| 9,695,592 B2 | | 7/2017 | Shiao et al. |
| 2004/0026525 A1 | | 2/2004 | Fiedrich |
| 2004/0184884 A1 | * | 9/2004 | DiTullio ................. E03F 1/003 138/121 |
| 2007/0062140 A1 | | 3/2007 | Sillik |
| 2010/0083600 A1 | * | 4/2010 | Certuse, Jr. ............... F16L 5/00 52/407.3 |

(Continued)

FOREIGN PATENT DOCUMENTS

| | | |
|---|---|---|
| CN | 114033092 A | 8/2023 |
| GB | 2204340 A | 9/1991 |

(Continued)

*Primary Examiner* — Basil S Katcheves
*Assistant Examiner* — Daniel J Kenny
(74) *Attorney, Agent, or Firm* — Stephen B. Katsaros; Patent Engineering, LLC

(57) ABSTRACT

The present disclosure relates to utility partition device and systems which may be configured to bifurcate the ceiling cavity from the utilities, by preventing the insulation material present in the ceiling cavity from rolling onto the utilities. The utility partition device may be vacuum-formed into a predefined structure. Additionally, the predefined structure may include a utility corridor to accommodate the utilities, thereby bifurcating the ceiling cavity from the utilities.

23 Claims, 19 Drawing Sheets

(56) References Cited

U.S. PATENT DOCUMENTS

| | | |
|---|---|---|
| 2012/0023844 A1 | 2/2012 | Certuse, Jr. |
| 2017/0191262 A1 | 7/2017 | Forbis et al. |
| 2019/0313586 A1 | 10/2019 | Van Gelder |
| 2023/0257986 A1* | 8/2023 | Douglass ............... B65D 88/76 220/567.1 |

FOREIGN PATENT DOCUMENTS

| | | |
|---|---|---|
| GB | 2485181 A | 9/2017 |
| JP | 2005114028 A | 4/2005 |
| KR | 100845461 B1 | 7/2008 |

* cited by examiner

UTILITY PARTITION DEVICE AND SYSTEM(s)

TECHNICAL FIELD

This disclosure pertains, but not by way of limitation, to utility partition devices and systems for utilities, more particularly to a utility partition device and systems to bifurcate ceiling cavities from the utilities.

BACKGROUND

Ceiling cavities are filled with insulating materials, including batt insulation, blown-in insulation, or rolled insulation, commonly utilized in constructed buildings to mitigate heat transfer between interior and exterior environments. The insulating materials are placed above utilities like fire sprinkler pipes and illumination systems and separated by cellulosic fiberboard sheets. However, there is a risk of insulating materials escaping through these sheets and covering the utilities, diminishing their efficiency. For example, the collapsing of the cellulosic fiberboards over time may result in the insulating material coming into contact with the utilities, such as sprinkler pipes, which may cause wet pipe utilities to freeze and burst.

SUMMARY

To this end, a utility partition device is disclosed. The utility partition device may bifurcate the ceiling cavity from the utilities, by preventing the insulation material present in the ceiling cavity from rolling onto the utilities. The utility partition device may be vacuum-formed, or formed using a thermal forming process, or injection molded into a predefined structure, which may further include one or more ribs, and one or more insulation pockets to trap and accommodate the insulation material. Additionally, the predefined structure may include a utility corridor to accommodate the utilities, thereby bifurcating the ceiling cavity from the utilities. While specific examples, configurations, and/or applications of the utility partition device are provided, it is to be understood that granted claims define the breadth and depth of the present disclosure. The following example(s) on the utility partition device illustrates the present utility partition device.

In one illustrative configuration, a utility partition to bifurcate a ceiling cavity from a utility is disclosed. The utility partition device may include a first wall. The first wall may further include a first wall proximal edge, and a first wall distal edge oppositely disposed to the first wall proximal edge by a first predefined height. The utility partition device may further include a second wall symmetrical to and offset from, the first wall by a predefined distance. The second wall may include a second wall proximal edge, and a second wall distal edge oppositely disposed to the second wall proximal edge by a second predefined height. Further, the utility partition device may include an impervious segment disposed between the first wall proximal edge to the second wall proximal edge. The first wall, the second wall, and the impervious segment collectively form a utility corridor separated from the ceiling cavity. The utility corridor may be configured to accommodate at least one utility.

In one illustrative configuration, a bifurcation method for bifurcating a ceiling cavity from a utility is disclosed. The bifurcation method may include a first step, in which a utility partition device may be provided. The utility partition may include a first wall. The first wall may further include a first wall proximal edge, and a first wall distal edge oppositely disposed to the first wall proximal edge by a first predefined height. The utility partition device may further include a second wall symmetrical to and offset from the first wall by a predefined distance. The second wall may include a second wall proximal edge, and a second wall distal edge oppositely disposed to the second wall proximal edge by a second predefined height. Further, the utility partition device may include an impervious segment disposed between the first wall proximal edge to the second wall proximal edge. In the next step, a utility corridor may be provided. The utility corridor may be separated from the ceiling cavity and collectively formed by the first wall, the second wall, and the impervious segment. In the next step, the ceiling cavity may be bifurcated from the utility by accommodating the utility in the utility corridor.

In one illustrative configuration, a utility partition system is disclosed. The utility partition system may be configured to bifurcate a ceiling cavity from a utility. The utility partition system may include a first utility partition. The first utility partition may include a first wall. The first wall may further include a first wall proximal edge, and a first wall distal edge oppositely disposed to the first wall proximal edge by a first predefined height. The first utility partition device may further include a second wall symmetrical to and offset from, the first wall by a predefined distance. The second wall may include a second wall proximal edge, and a second wall distal edge oppositely disposed to the second wall proximal edge by a second predefined height. The utility partition system may include a second utility partition. The first utility partition may include a cutting guide formed on at least one of the first wall, the second wall, and the impervious segment. The second utility partition may include a first wall. The first wall may further include a first wall proximal edge, and a first wall distal edge oppositely disposed to the first wall proximal edge by a first predefined height. The second utility partition device may further include a second wall symmetrical to and offset from, the first wall by a predefined distance. The second wall may include a second wall proximal edge, and a second wall distal edge oppositely disposed to the second wall proximal edge by a second predefined height. The second utility partition may include a cutting guide formed on at least one of the first wall, the second wall, and the impervious segment. Further, each of the first utility partition and the second utility partition may include a utility corridor separated from the ceiling cavity. The utility corridor may be configured to accommodate the utility. The utility partition system may further include a cut configuration, in which the first utility partition may be cut along the cutting guide such that the first wall, the second wall, and the impervious segment form a shape corresponding to the shape of the impervious segment of the second utility partition. Further, the utility partition system may include an adjoined configuration, in which the first utility partition after being cut may be adjoined to the second utility partition such that the second utility partition is perpendicular to the first utility partition.

In one illustrative configuration, each utility partition device may include a hoisting groove. The hoisting groove may allow passage of hoisting means, such as ropes and the like. The hoisting means may be suspended from a scaffolding structure on the ceiling frame and may be wounded to the hoisting groove in the utility partition device. Accordingly, the utility partition device may be hauled about the ceiling frame.

Further areas of applicability of the present disclosure will become apparent from the detailed description provided hereinafter. It should be understood that the detailed description and specific examples while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered exemplary only, with the true scope and spirit being indicated by the following claims.

Utilities such as fire sprinkler pipes or ceiling lighting devices may get covered by insulation materials filled in a cavity of the ceiling. As a result, the efficiency of the utilities may decrease in addition to risks. For example, if the insulation material when rolled over the fire sprinkler pipe, the fire sprinkler pipe may not be heated or kept warm enough by the temperature of the room to prevent freezing of water present therein. Therefore, in case of frigid weather conditions, water present in the utilities may freeze and as a result, a risk of leakage or bursting of the utility may be posed.

To this end, illustrative configurations of a utility partition system are disclosed. The utility partition system may include at least one utility partition device. Moreover, the utility partition device may include a utility corridor configured to accommodate the utility, thereby bifurcating the utility from the insulation material.

Figure 1:
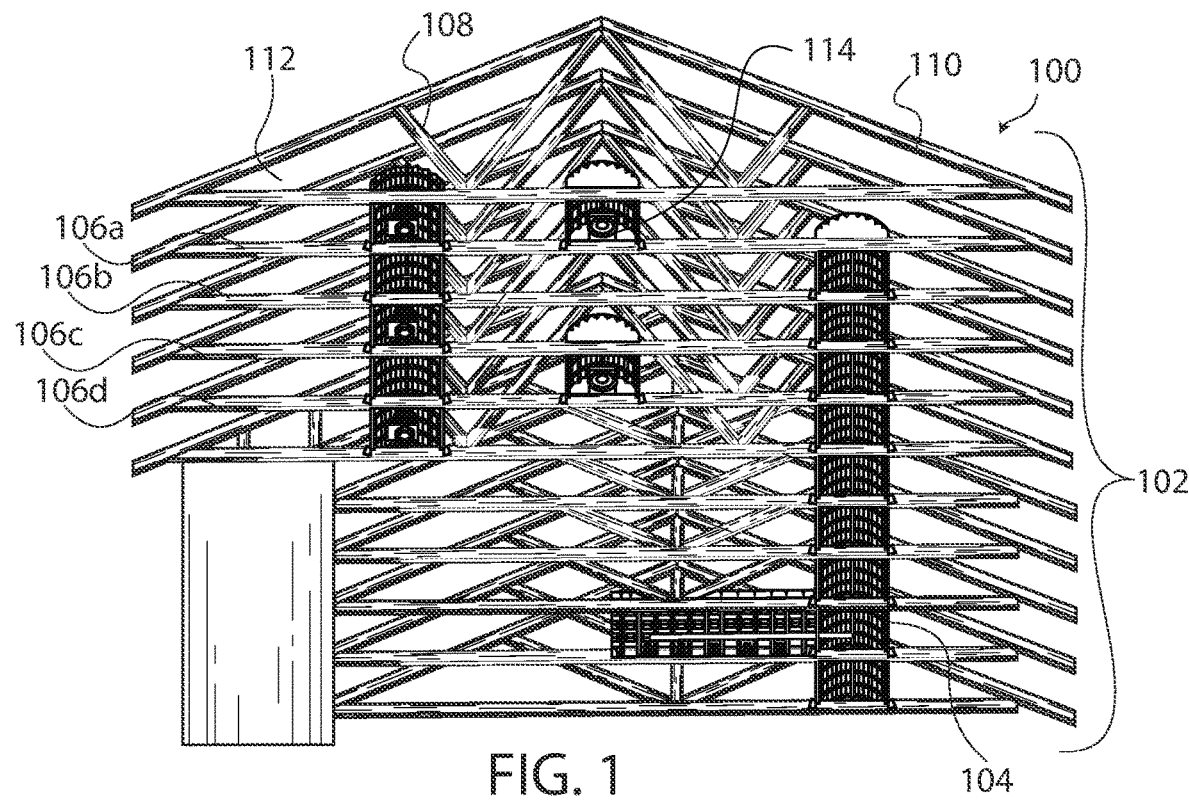
FIG. 1 illustrates a bottom-perspective view of a ceiling frame embedded with the utility partition system.
Figure 2:
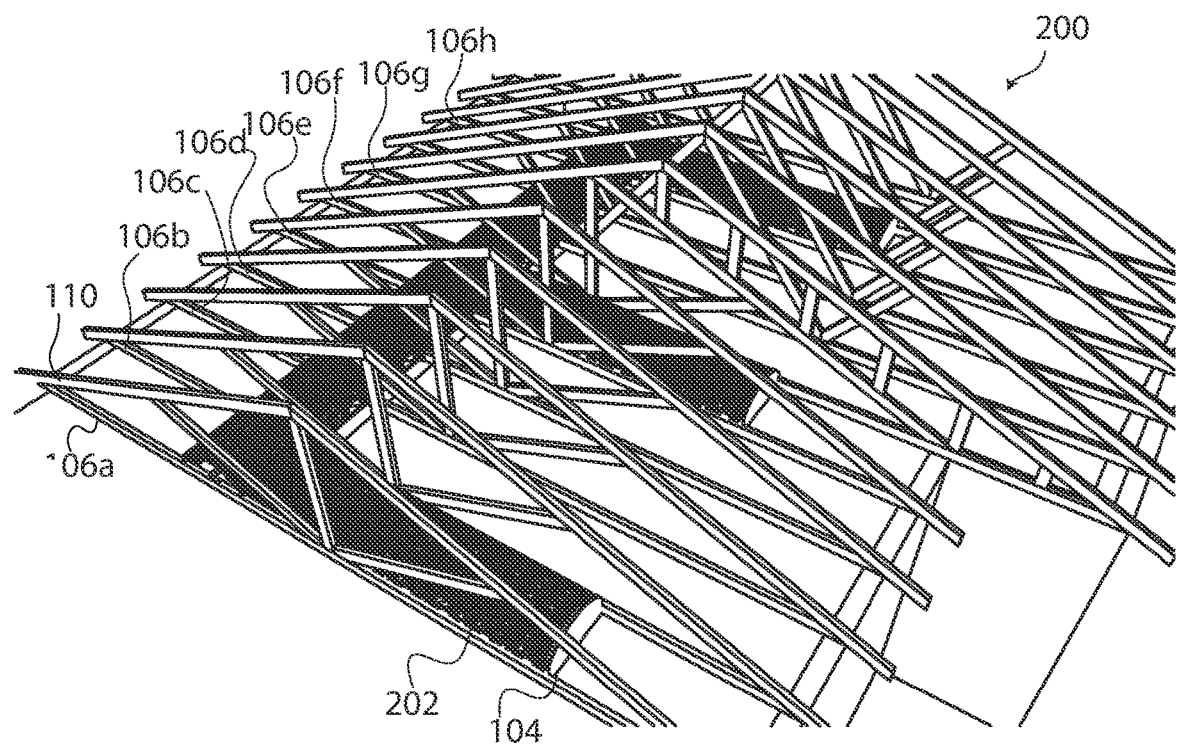
FIG. 2 illustrates a top-perspective view of a ceiling frame embedded with the utility partition system.

In an illustrative configuration, FIG. 1, illustrates a bottom-perspective view 100 of a ceiling frame 102 embedded with the utility partition system 104, and FIG. 2 illustrates a top-perspective view 200 of the ceiling frame embedded with the utility partition system 104.

With continuous reference to FIGS. 1-2, the ceiling frame 102 may include one or more joists 106a, 106b, 106c . . . (hereinafter referred to as joists 106), a truss 108 adjoined to each of the joists 106, and a rafter 110 adjoined to the truss 108. The joists 106, the truss 108, and the rafter 110 may collectively define a ceiling cavity 112 in the ceiling frame 102. In an illustrative configuration, the utility partition system 104 may be accommodated in the ceiling cavity 112 and fixated to the joists 106. The utility partition system 104 may be configured to accommodate one or more utility 114, and hence, the one or more utility 114 may be bifurcated from the ceiling cavity 112. This is illustrated in successive configurations of this disclosure.

Figure 3:
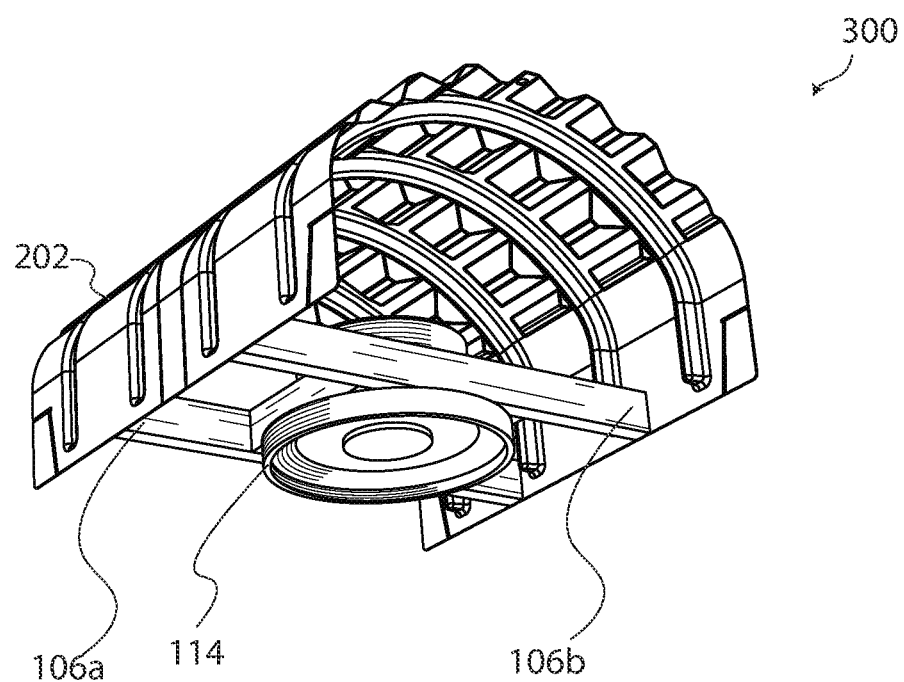
FIG. 3 illustrates a bottom perspective view of a utility installed within the utility partition system.
Figure 4:
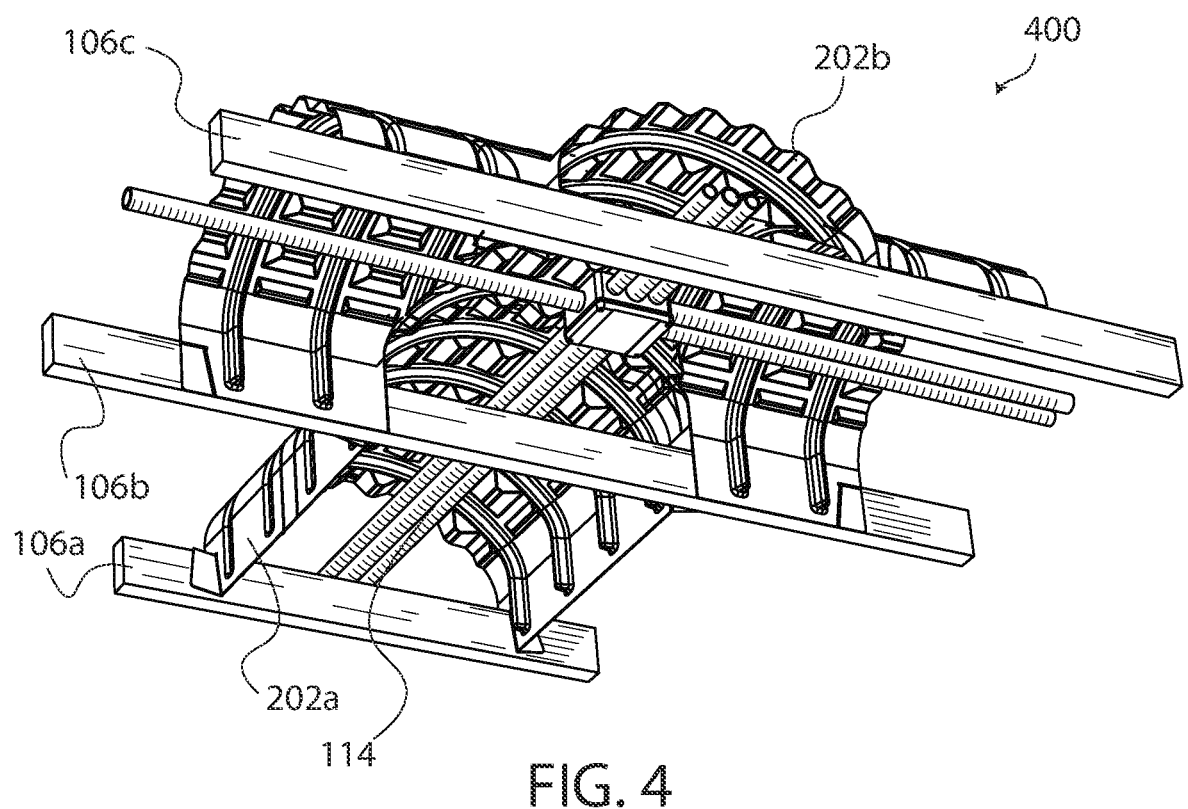
FIG. 4 illustrates another bottom-perspective view of a utility installed within the utility partition system.
Figure 5:
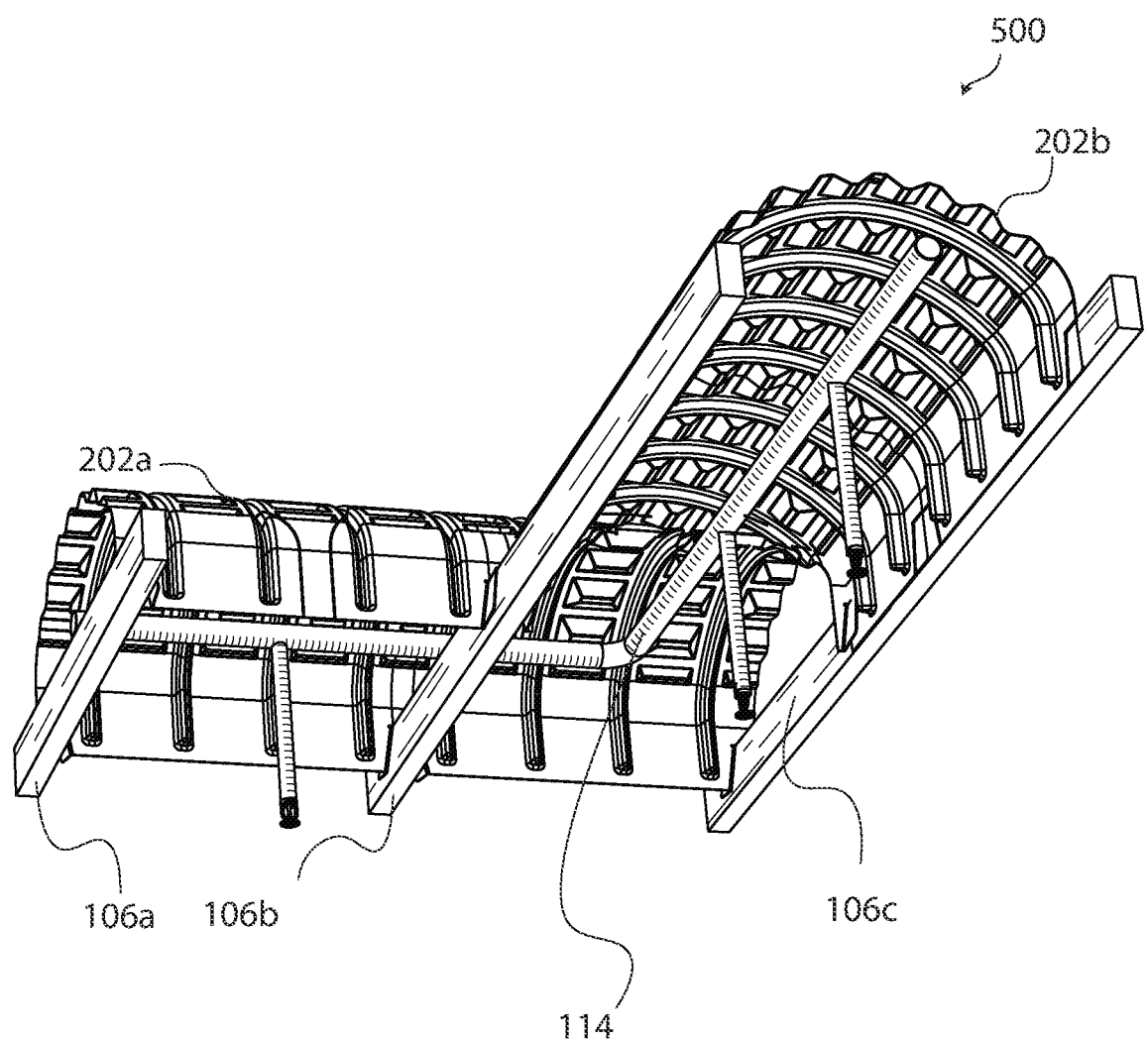
FIG. 5 illustrates another bottom-perspective view of a utility installed within the utility partition system.

In an embodiment, FIG. 3 illustrates a bottom perspective view 300 of a utility 114 installed within the utility partition system 104. FIG. 4 illustrates another bottom perspective view 400 of the utility 114 installed within the utility partition system. FIG. 5 illustrates another bottom perspective view 500 of a utility installed within the utility partition system.

As explained earlier, with continuous reference to FIGS. 3-5, the utility partition system 104 may be installed in the ceiling cavity 112 and adjoined to the joists 106. In an illustrative configuration, the utility partition system 104 may be formed by adjoining one or more utility partition devices 202a, 202b, 202c . . . (hereinafter referred to as utility partition devices 202 in FIG. 2). The utility partition devices 202 may include a utility corridor or a utility cavity, which may be configured to accommodate the one or more utility 114. In an exemplary configuration, the one or more utility 114 may include, but not limited to an audio system, a ceiling lamp (refer to FIG. 3), a wiring assembly (refer to FIG. 4), or a fire sprinkler pipe (refer to FIG. 5).

In an illustrative configuration, the utility corridor may be defined by a space within the utility partition device 202. Particularly, the utility partition device 202 may include one or more walls and an impervious section, which may collectively form a hollow channel therebetween. This hollow channel may be represented as the utility corridor. This is explained in conjunction with FIGS. 6-9.

Figure 6:
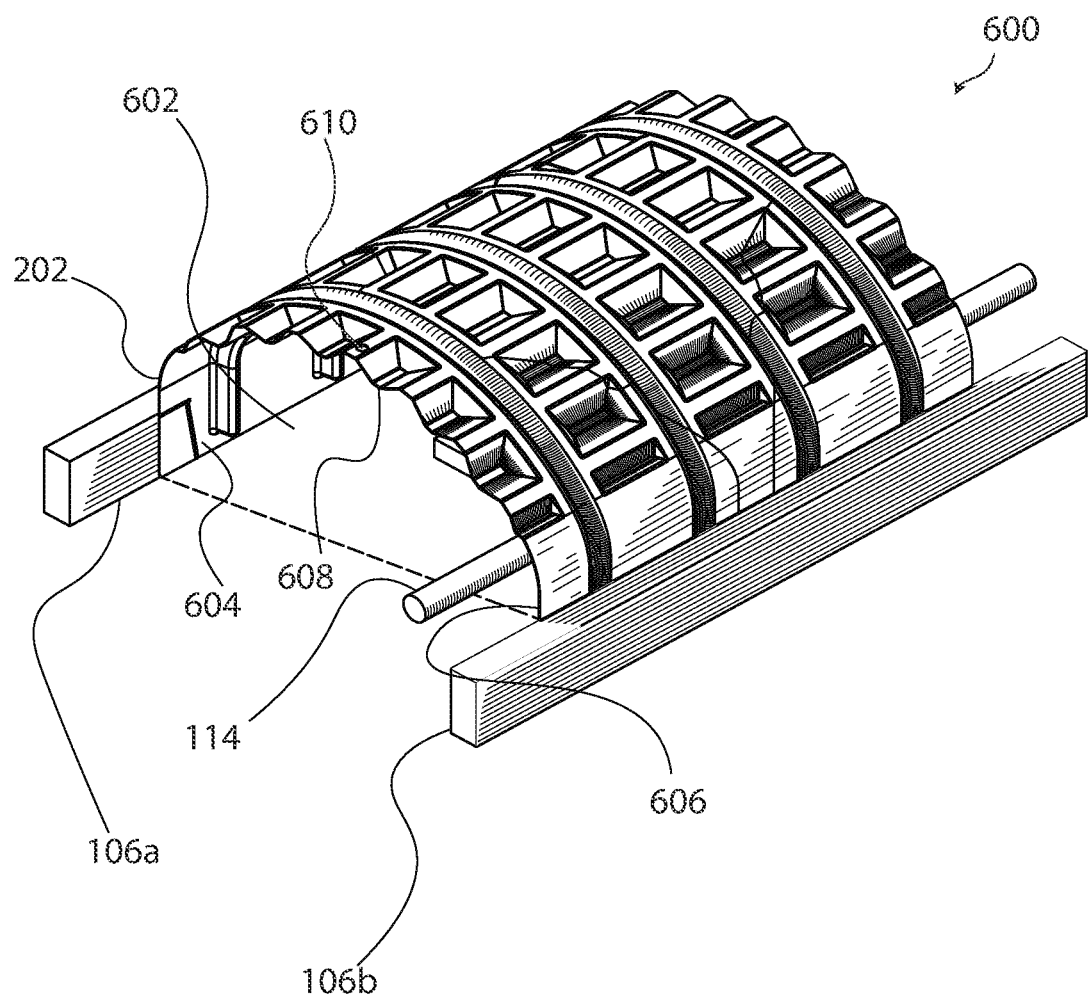
FIG. 6 illustrates a perspective view of the utility partition system of FIG. 1.
Figure 7:
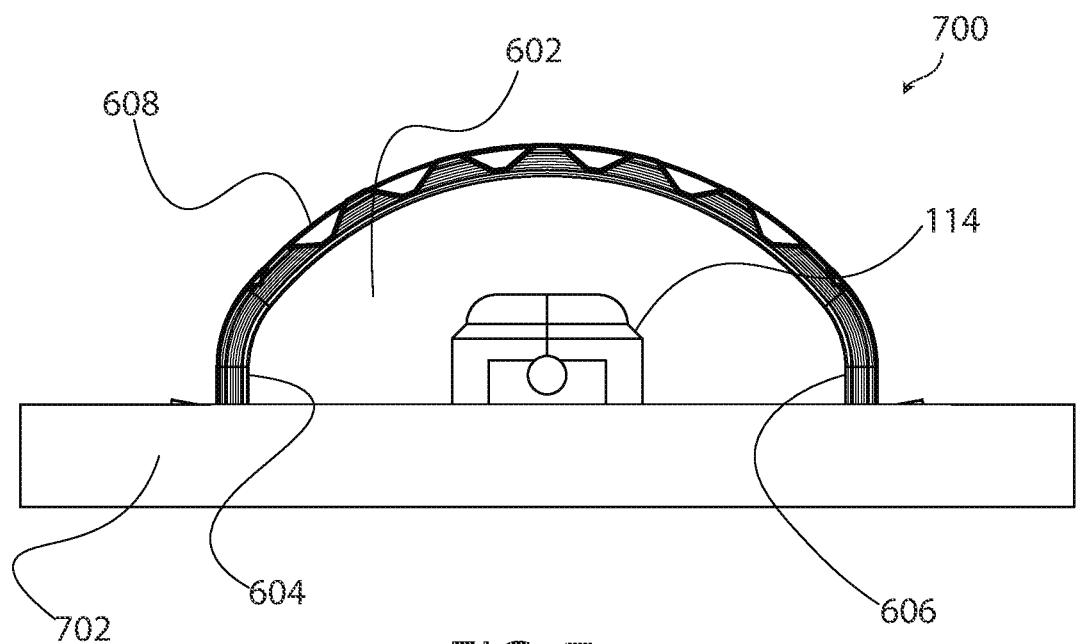
FIG. 7 illustrates a front view of the utility partition system of FIG. 1.
Figure 8:
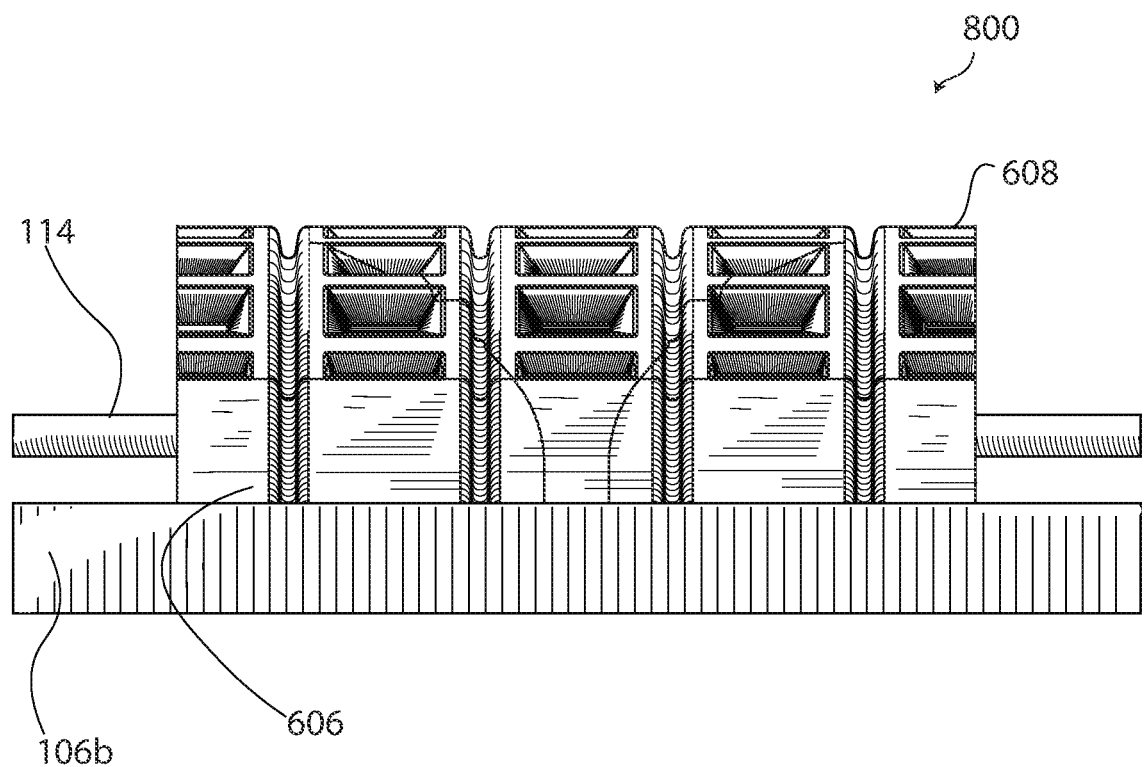
FIG. 8 illustrates a side view of the utility partition system of FIG. 1.
Figure 9:
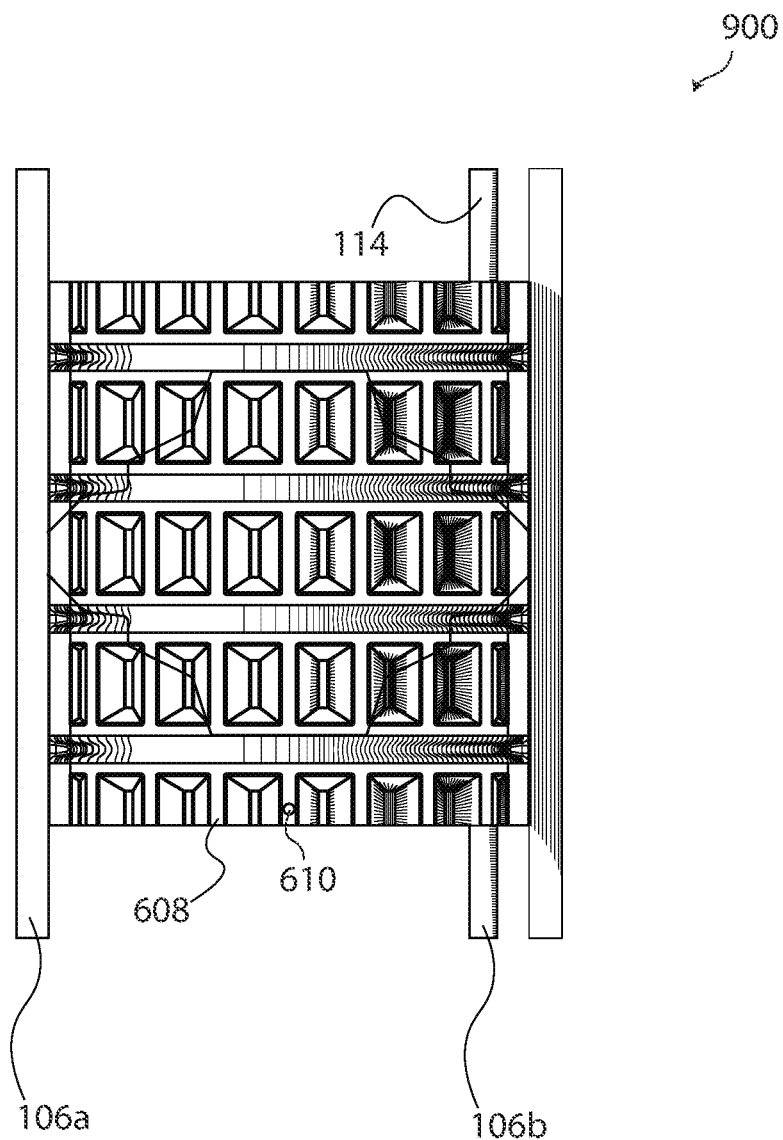
FIG. 9 illustrates a top view of the utility partition system of FIG. 1.

In an illustrative configuration, FIG. 6 illustrates a perspective view 600 of the utility partition device 202, FIG. 7 illustrates a front view 700 of the utility partition device 202, FIG. 8 illustrates a side view 800 of the utility partition device 202, and FIG. 9 illustrates a top view 900 of the utility partition device 202.

In an illustrative configuration, with continued reference to FIGS. 6-9, each of the at least one utility partition device 202 may include a first wall 604, a second wall 606 symmetrical to, and offset from the first wall 604 by a predefined distance, and an impervious segment 608 disposed between the first wall 604 and the second wall 606. In an illustrative configuration, an internal region formed by the first wall 604, the second wall 606, and the impervious segment may form the utility corridor 602. As explained earlier, the utility corridor 602 may be configured to receive the one or more utility 114, thereby bifurcating the ceiling cavity 112 from the one or more utility 114.

In an illustrative configuration, the impervious segment 608 may be disposed between the first wall 604 and the second wall 606. The impervious segment 608 may be formed as a curved structure, such as but not limited to an arc structure, a semicircular structure, and the like. In an illustrative configuration, the impervious segment 608, along with the first wall 604 and the second wall 606 may form a hollow semi-cylinder structure, which may include the utility corridor 602 therein.

In an illustrative configuration, with continuous reference to FIGS. 6-9, the utility partition devices 202 may be fixated in-line to the joists 106, or perpendicular the joists 106. In an exemplary configuration, when the utility partition device 202 may be fixated in-line with the joists 106, the first wall 604 may be adjoined in-line to a first joist 106a, and the second wall 206 may be adjoined in-line to a second joist 106b. Such arrangement is favorable when the utility corridor 602 may accommodate the utility 212 that may include one or more ceiling lamps arranged in a linear array, or a fire sprinkler pipe (refer to FIGS. 3-5). In an illustrative configuration, referring to FIG. 7, the utility partition devices 202 may be fixated perpendicular the first joist 106a and the second joist 106b, or to a hanging beam 702. This arrangement may be best suited for a perpendicular arrangement of the utility 212, i.e., a perpendicular arrangement of the sprinkler pipe (refer to FIG. 5).

In one configuration, the each utility partition device 202 may include at least one hoisting groove 610. The hoisting groove 610 may be configured to accommodate a portion of a hoisting means, such as but not limited to ropes and the like. The hoisting means may be suspended from a scaffolding structure on the ceiling frame, or from the rafter 110 and may be wound to the hoisting groove 610 in the utility partition device 202. Therefore, using the hoisting groove 610 and the hoisting means, the utility partition device may be hauled about the ceiling frame 102.

In one configuration, the utility partition device 202 may be formed using one or more processes, selected from but not limited to injection molding, thermoforming, pressure forming, blow-molding, vacuum forming, and the like. In an exemplary configuration, the utility partition device 202 may be formed using the vacuum forming process, in which a heated thermoplastic sheet may be molded over a buck under a vacuum. The utility partition device 202 may be configured to establish a thermal break, capable of enduring and capturing thermal energy emitted from a sub-surface or an attic onto which the utility partition system 104 may be positioned. Consequently, due to heat resistance characteristics of the thermoplastic sheet, the emitted thermal energy may be trapped to maintain the utility 114, such as for example, a fire sprinkler pipe, at a sufficiently warm temperature to prevent freezing. Additionally, the thermoplastic sheet may also include a transparent sheet, which may enable a user to inspect the coverage of insulating material, when placed above the utility partition device 202.

As explained earlier, the utility partition device 202 may be configured to bifurcate the ceiling cavity 112 from the utility 114. Consequently, the insulation material may be restricted by the utility partition device 202 from rolling over from the ceiling cavity 112 onto the utility 114. As such, the utility partition device 202 may include one or more ribs, as well as one or more insulation pockets which may be configured to accommodate and trap the insulation material thereon, as well as forming the utility partition device 202 as a rigid structure. This is explained in detail in conjunction with FIGS. 10-13.

Figure 10:
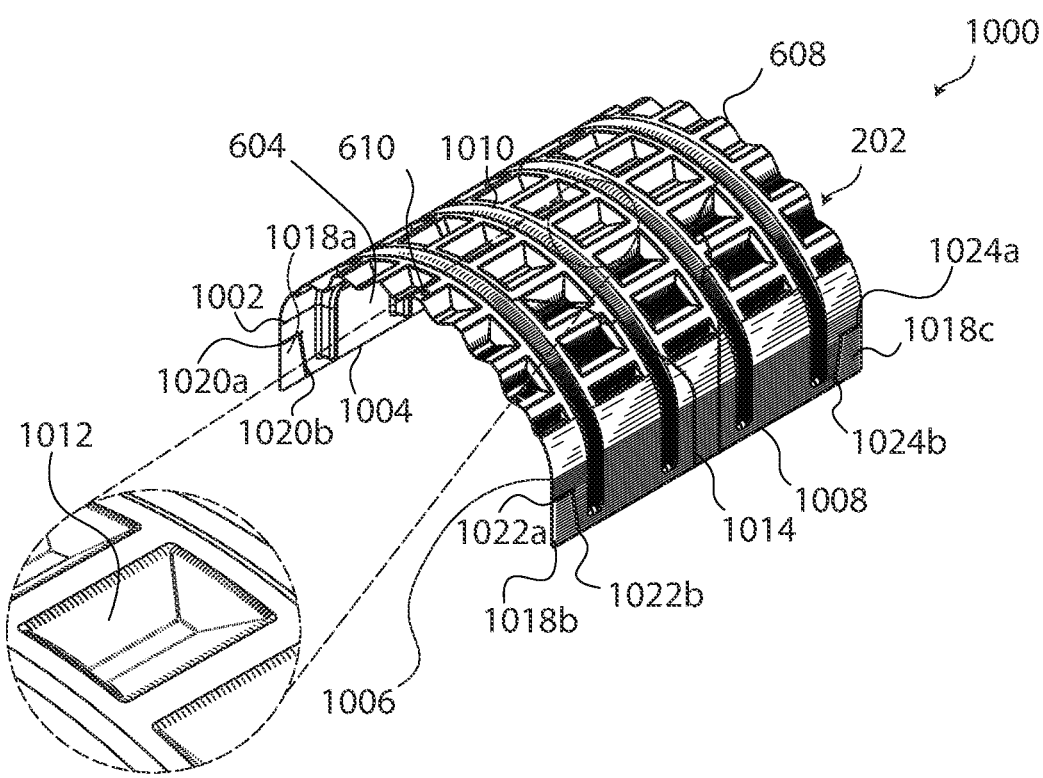
FIG. 10 illustrates a perspective view of a utility partition device.
Figure 11:
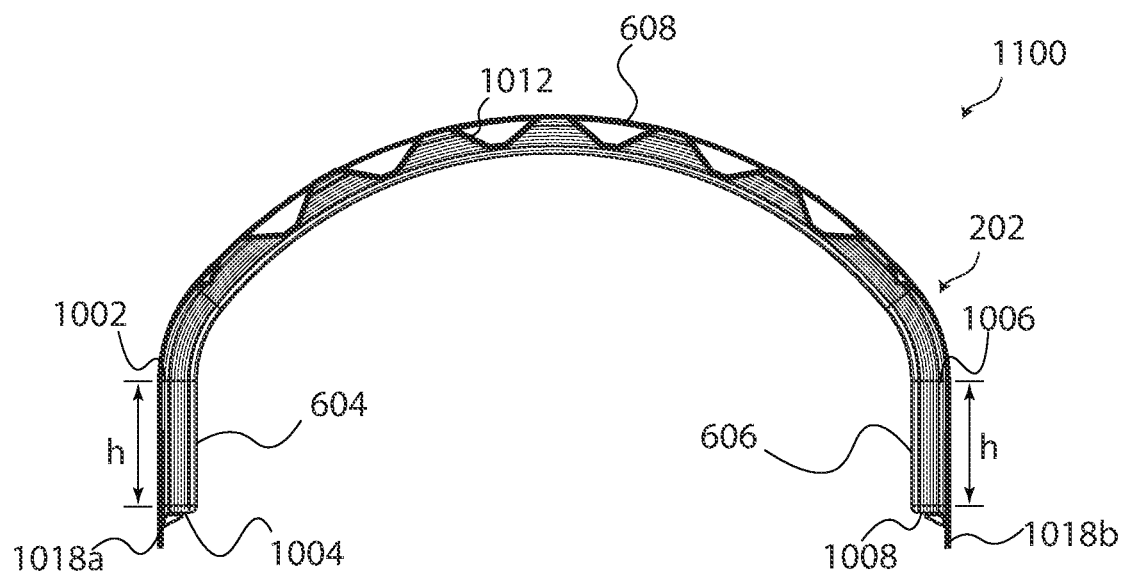
FIG. 11 illustrates a front view of the utility partition device of FIG. 10.
Figure 12:
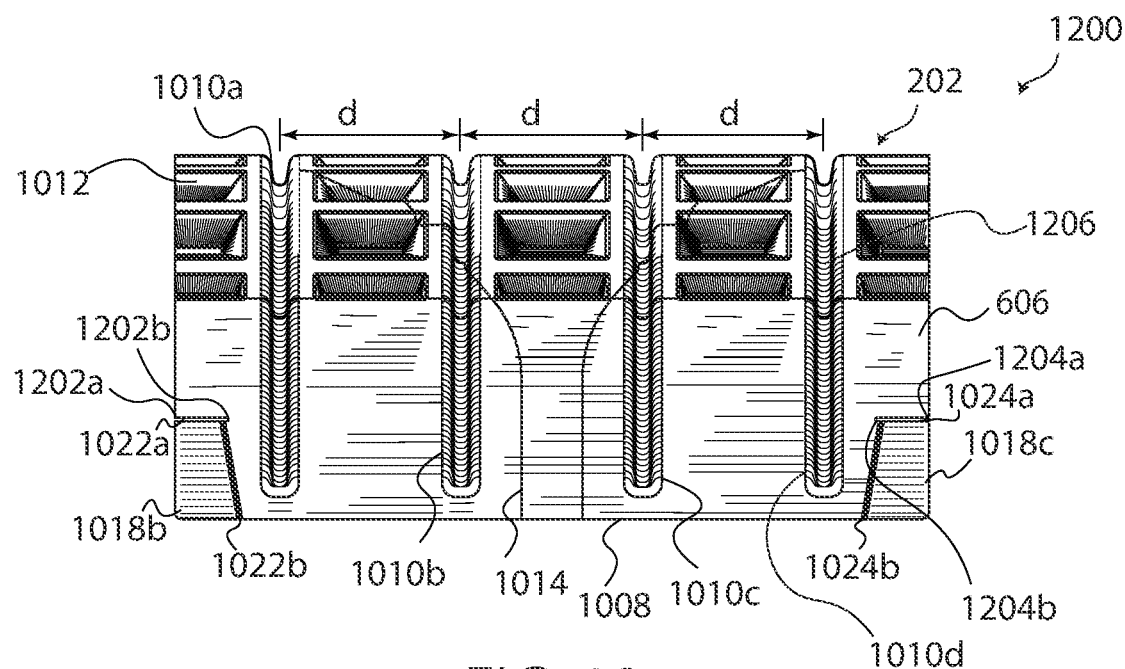
FIG. 12 illustrates a left-side view of the utility partition device of FIG. 10.
Figure 13:
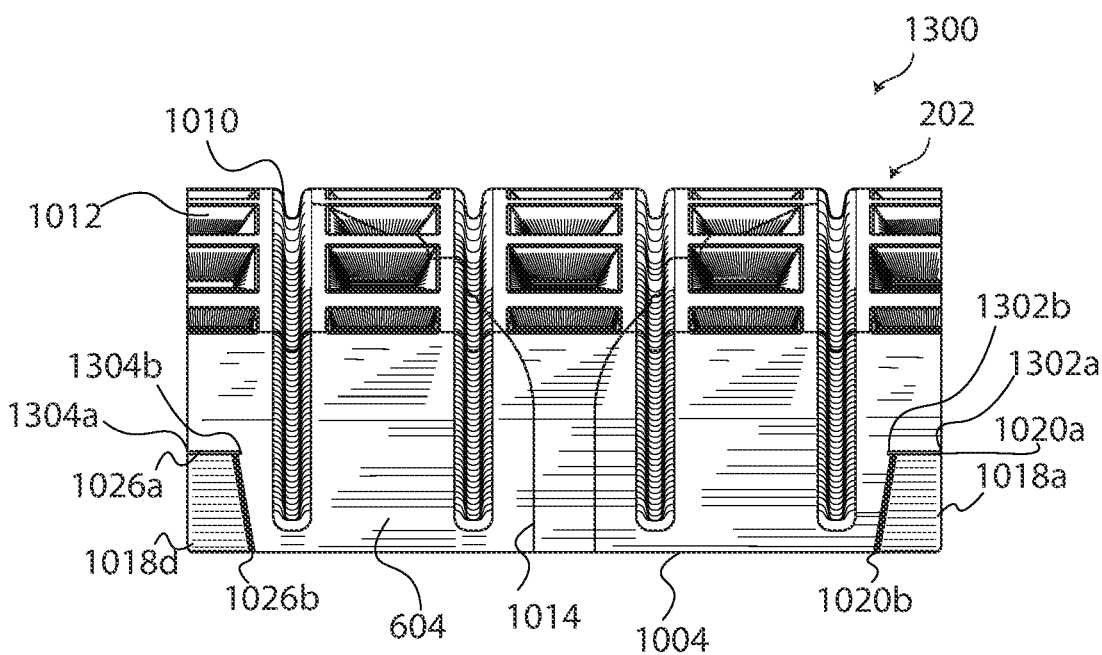
FIG. 13 illustrates a right-side view of the utility partition device of FIG. 10.

In an illustrative configuration, FIG. 10 illustrates a perspective view 1000 of the utility partition device 202, FIG. 11 illustrates a front view 1100 of the utility partition device 202, FIG. 12 illustrates a left-side view 1200 of the utility partition device 202, and FIG. 13 illustrates a right-side view 1300 of the utility partition device 202.

In an illustrative configuration, referring to FIGS. 10-13, the first wall 604 may include a first wall proximal edge 1002, and a first wall distal edge 1004 oppositely disposed to the first wall proximal edge 1002. The first wall distal edge 1004 and the second wall proximal edge 1006 may be separated by a predefined height h (refer to FIG. 11). Moreover, the first wall proximal edge 1002 may be represented as an upper leading edge of the first wall 604, and the first wall distal edge 1004 may be represented as a lower leading edge or a free edge of the first wall 604.

Accordingly, the second wall 606 may include a second wall proximal edge 1006, and a second wall distal edge 1008 oppositely disposed to the second wall proximal edge 1006. Similar to the first wall 604, the second wall proximal edge 1006 may represent an upper leading edge of the first wall 604, and the second wall distal edge 1008 may represent a lower leading edge or a free edge of the second wall 606. Similar to the first wall 604, the second wall proximal edge 1006 and the second wall distal edge 1008 may be separated by the predefined height h. Further, the impervious segment 608 may be formed between the first wall proximal edge 1002 and the second wall proximal edge 1006.

In an illustrative configuration, with continued reference to FIGS. 10-13, at least one of the first wall 604, the second wall 606, and the impervious segment 608 may include one or more ribs 1010. For example, the one or more ribs 1010 may span from the first wall 604 to the second wall 606 via the impervious segment 608. In an illustrative configuration, the one or more ribs 1010 may be formed as a continuous curved groove on at least one of the first wall 604, the second wall 606, and the impervious segment 608. The continuous curved groove may include, but not limited to a semicylinder groove, a semicircular groove, a trapezoidal groove, and the like. In an illustrative configuration, the one or more ribs 1010 may be configured to provide structural rigidity to the utility partition device 202 to prevent the impervious segment 608 from bending under the weight of the insulation material. In an illustrative configuration, the groove of the one or more ribs 1010 may act as an interlocking structure for the insulation material. For example, the insulation material above the utility partition device 202 may be accommodated and interlocked within the groove of the one or more ribs 1010. As a result, the weight of the insulation material on the utility partition device 202 may be distributed along the one or more ribs 1010, and hence, the concentration of the weight at a single portion of the utility partition device 202 may be prevented. Therefore, the weight of the insulation material may be equally distributed on the one or more ribs 1010, and bending of the impervious segment 608 may be prevented.

In an illustrative configuration, each rib from the one or more ribs 1010 may be separated from a successive rib by a predefined length d (refer to FIG. 12). For example, a first rib 1010a and a second rib 1010b may be separated by the predefined length d. Furthermore, one or more sequential ribs may be formed between the first rib 1010a and the last rib 1010d. It must be noted that each sequential rib may be separated by the predefined distance d. Further, the one or more ribs 1010 may include one or more interlock structures 1206, which may be configured to engage the one or more ribs of one or more utility partition devices 202. For example, the rib 1010a may engage the rib 1010d of another utility partition device 202 via the interlock structure 1206, and hence, both the utility partition device may be arranged together in a single array.

In one configuration, in scenarios such as but not limited to transporting of the one or more utility partition device 202, the one or more utility partition device 202 may be arranged in a stacked arrangement. In the stacked arrangement, the one or more utility partition device 202 may be stacked one above another by engaging each interlock structure 1206 of a rib 1010 in one utility partition device 202 with a corresponding interlock structure 1206 of the rib 1010 in the sequential utility partition device 202. Therefore, when stacked in such fashion, the one or more utility partition device 202 may be transported to any desired location prior to assembling on to the joists 106.

In an illustrative configuration, the impervious segment 608 may include one or more insulation pockets 1012. The one or more insulation pockets 1012 may be formed on each predefined gaps formed by two successive ribs 1010. In an illustrative configuration, the one or more insulation pockets 1012 may be arranged in a linear array, which may span throughout the curved structure of the impervious segment 608. Further, each insulation pocket from the one or more insulation pockets 1012 may be formed in a predefined shape, such as a trapezoidal shape. The one or more insulation pockets 1012 may be configured to accommodate the insulation material therein and prevent the insulation from sliding off and creating an area of reduced insulation material on the utility partition device 202. By accommodating the insulation material, the one or more insulation pockets 1012 may also account for the weight of the insulation material accumulated thereon, and hence, the weight of the insulation material on the one or more ribs 1010 may be reduced accordingly. Therefore, along with the one or more ribs 1010, the one or more insulation pockets 1012 may also be configured to provide structural rigidity to the utility partition device 202.

In an illustrative configuration, the utility partition device 202 may include one or more cutting guides 1014. Each cutting guide from the one or more cutting guides 1014 may be formed as a line on the at least one of the first wall 604, the second wall 606, and the impervious segment 608. In an illustrative configuration, the one or more cutting guides 1014 may include one or more portions. The one or more portions may include one or more perpendicular portions and a transverse portion. In an exemplary configuration, the perpendicular portions may be disposed on the first wall 604, and the second wall 606, and the transverse portion may be disposed on the impervious segment 608. The perpendicular portion may represent the portion of the cutting guides 1014 being perpendicular to the first wall distal edge 1004 and the second wall proximal edge 1006, and the transverse portion may be formed as an angled line formed between the successive ribs of the one or more ribs 1010. Conjunctively, one or more portions of the one or more cutting guides 1014 may define a curvature corresponding to the curved structure of the impervious segment 608.

Formation of the one or more ribs 1010, the one or more insulation pockets 1012, and the one or more cutting guides 1014 on the utility partition device 202 may be achieved during the manufacturing stage. In an exemplary configuration, the utility partition device 202 may be formed through a vacuum forming process, in which a heated thermoplastic sheet may be heated and molded over a buck under a vacuum. The buck utilized for molding the sheet may incorporate one or more profiles corresponding to the one or more ribs 1010, the one or more insulation pockets 1012, and the one or more cutting guides 1014. Consequently, when the heated thermoplastic sheet is molded onto the one or more profiles and subjected to vacuum, the one or more ribs 1010, the one or more insulation pockets 1012, and the one or more cutting guides 1014 are effectively formed on the utility partition device 202.

In an illustrative configuration, the utility partition device 202 may include one or more flap portions 1018a, 1018b, 1018c, and 1018d. Particularly, the first wall 604 may include flap portions 1018a, and 1018d, and the second wall 606 may include flap portions 1018b, and 1018c. Each flap portions 1018a, 1018b, 1018c, and 1018d may be formed by a portion between a combination of a slit and a folding edge formed on both. For example, the flap portion 1018a may be formed by a portion between a slit 1020a and a folding edge 1020*b*, the flap portion 1018*b* may be formed by a portion between a slit 1022*a* and a folding edge 1022*b*, the flap portion 1018*c* may be formed by a portion between a slit 1024*a* and a folding edge 1024*b* (refer to FIG. 12), and the flap portion 1018*d* may be formed by a portion between a slit 1026*a* and a folding edge 1026*b* (refer to FIG. 13).

In an illustrative configuration, the slits 1020*a*, 1022*a*, 1024*a*, and 1026*a* may be formed by introducing a cut of predefined length and predefined thickness from lateral edges of the first wall 604 and the second wall 606. For example, the slits 1020*a*, and 1026*a* may be formed by introducing a cut from the lateral edges of the first wall 604 and may be transpose to the first wall proximal edge 1002 and first wall distal edge 1004. Similarly, the slits 1022*a*, and 1024*a* may be formed by introducing the cut from the lateral edges of the second wall 606 and may be transpose to the second wall proximal edge 1006 and the second wall distal edge 1008.

In an illustrative configuration, with continued reference to FIGS. 12-13, the slits 1020*a*, 1022*a*, 1024*a*, and 1026*a* may be adjoined to the folding edges 1020*b*, 1022*b*, 1024*b*, and 1026*b*. Particularly, each slit from the slits 1020*a*, 1022*a*, 1024*a*, and 1026*a* may include a first end, or a free end at the lateral edges of the first wall 604 and second wall 606, and a second end oppositely disposed to the first end. For example, referring to FIG. 13, the slit 1020*a* may include a first end 1302*a* and a second end 1302*b* oppositely disposed to the first end 1302*a*. Further, the slit 1022*a* may include a first end 1202*a* and a second end 1202*b* oppositely disposed to the first end 1202*a*. Further, referring to FIG. 12, the slit 1024*a* may include a first end 1202*a* and a second end 1202*b* oppositely disposed to the first end 1202*a*, and referring to FIG. 13, the slit 1026*a* may include a first end 1304*a* and a second end 1304*b* oppositely disposed to the first end 1304*a*. In an illustrative configuration, the folding edge 1020*b* may be adjoined to the second end 1302*b* and may be extended to the first wall distal edge 1004. Similarly, the folding edge 1022*b* may be adjoined to the 1202*b* and may be extended to the second wall distal edge 1008, the folding edge 1024*b* may be adjoined to the second end 1204*b* and may extend to the second wall distal edge 1008, and the folding edge 1026*b* may be adjoined to the second end 1304*b* and may extend to the first wall distal edge 1004. In an illustrated configuration, the folding edges 1020*b*, 1022*b*, 1024*b*, and 1026*b* may be transverse to the first wall distal edge 1004 and the second wall distal edge 1008. For example, the folding edges 1022*b* and 1024*b* may be transverse to the first wall distal edge 1004 at a predefined angle, and the folding edges 1020*b* and 1026*b* may be transverse to the second wall distal edge 1008 at a predefined angle.

In an illustrative configuration, the one or more flap portions 1018*a*, 1018*b*, 1018*c*, and 1018*d* may be configured to act as a guide during installation. For example, the one or more flap portions 1018*a*, 1018*b*, 1018*c*, and 1018*d* may be folded at a predefined angle, or may be arranged in-line to the first wall 604 or the second wall 606. Accordingly, such arrangement of the flap portions 1018*a*, 1018*b*, 1018*c*, and 1018*d* may guide the utility partition device 202 in between the joists 106. Therefore, the restriction of the utility partition device 202 by the joists 106, especially during installation, may be prevented.

In an illustrative configuration, each of the folding edges 1020*b*, 1022*b*, 1024*b*, and 1026*b* may be formed as a flexible bending portion. The flexible bending portion may include, but not limited to a living hinge, or a cross-section having a thickness less than the thickness of the utility partition device 202. Consequently, the flexible bending portion when bent may enable the one or more flap portions 1018*a*, 1018*b*, 1018*c*, and 1018*d* to be foldable about the folding edges 1020*b*, 1022*b*, 1024*b*, and 1026*b*, in one or more arrangements. The one or more arrangements may include an open flap arrangement and a closed flap arrangement.

In an illustrative configuration, with continued reference to FIGS. 10-13, the one or more flap portions 1018*a*, 1018*b*, 1018*c*, and 1018*d* may be arranged in the closed flap arrangement. As the name suggests, the closed flap arrangement may include the one or more flap portions 1018*a*, 1018*b*, 1018*c*, and 1018*d* being closed, i.e., arranged in-line with the first wall 604 and the second wall 606. The closed flap arrangement may be preferred when the utility partition device 202 may be assembled in-line with the joists 106 (refer to FIG. 6), and the open flap arrangement may be preferred when the utility partition device 202 may be arranged perpendicular to the joists 106 (refer to FIG. 5). The open flap arrangement is explained in detail in conjunction with FIGS. 14-17.

Figure 14:
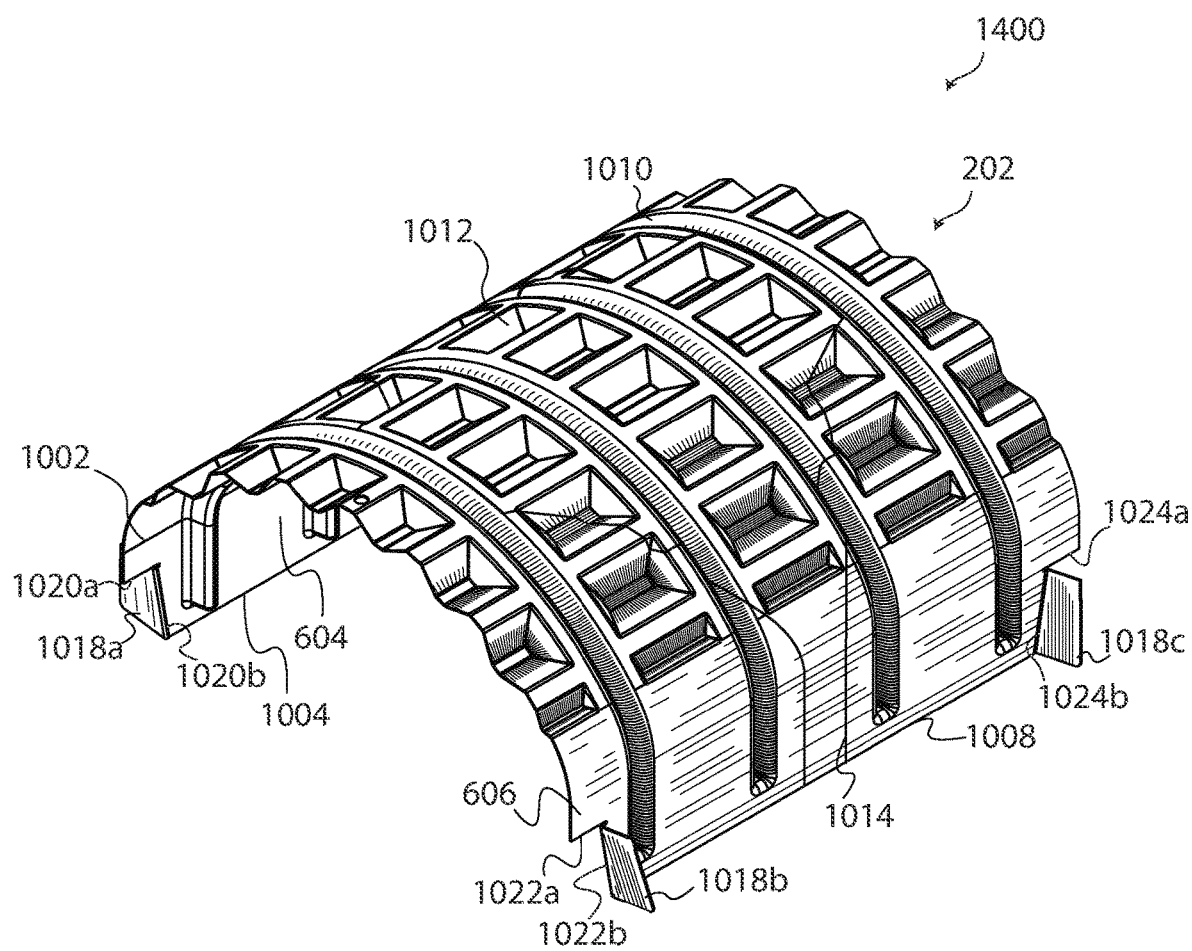
FIG. 14 illustrates a perspective view of the utility partition device in an open flap arrangement.
Figure 15:
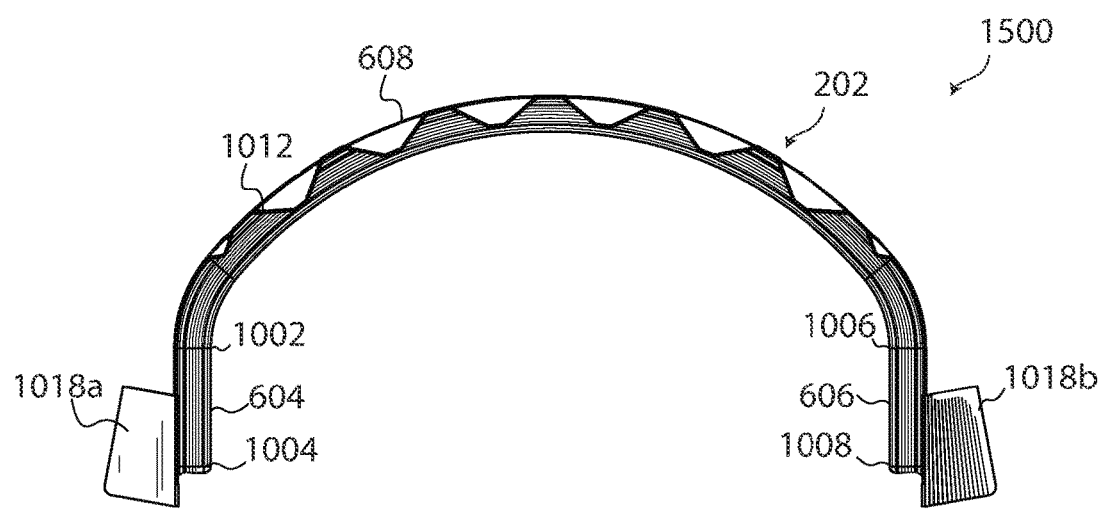
FIG. 15 illustrates a front view of the utility partition device in the open flap arrangement of FIG. 13.
Figure 16:
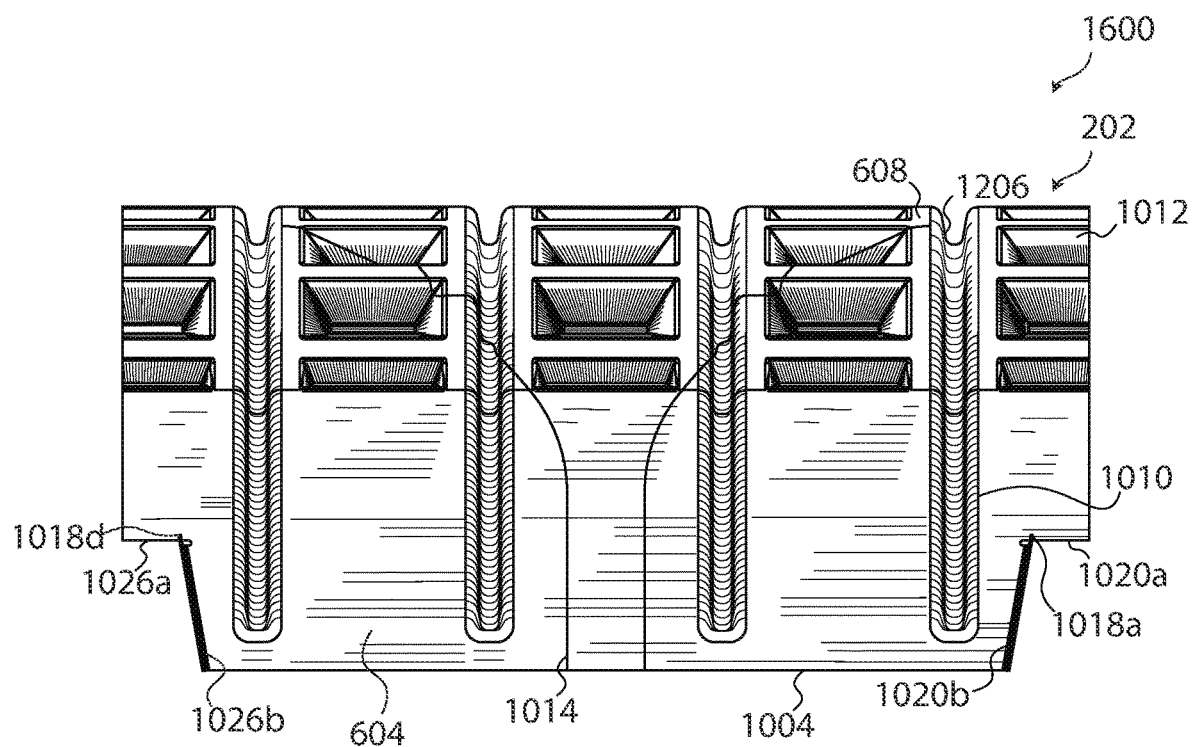
FIG. 16 illustrates a left-side view of the utility partition device in the open flap arrangement of FIG. 13.
Figure 17:
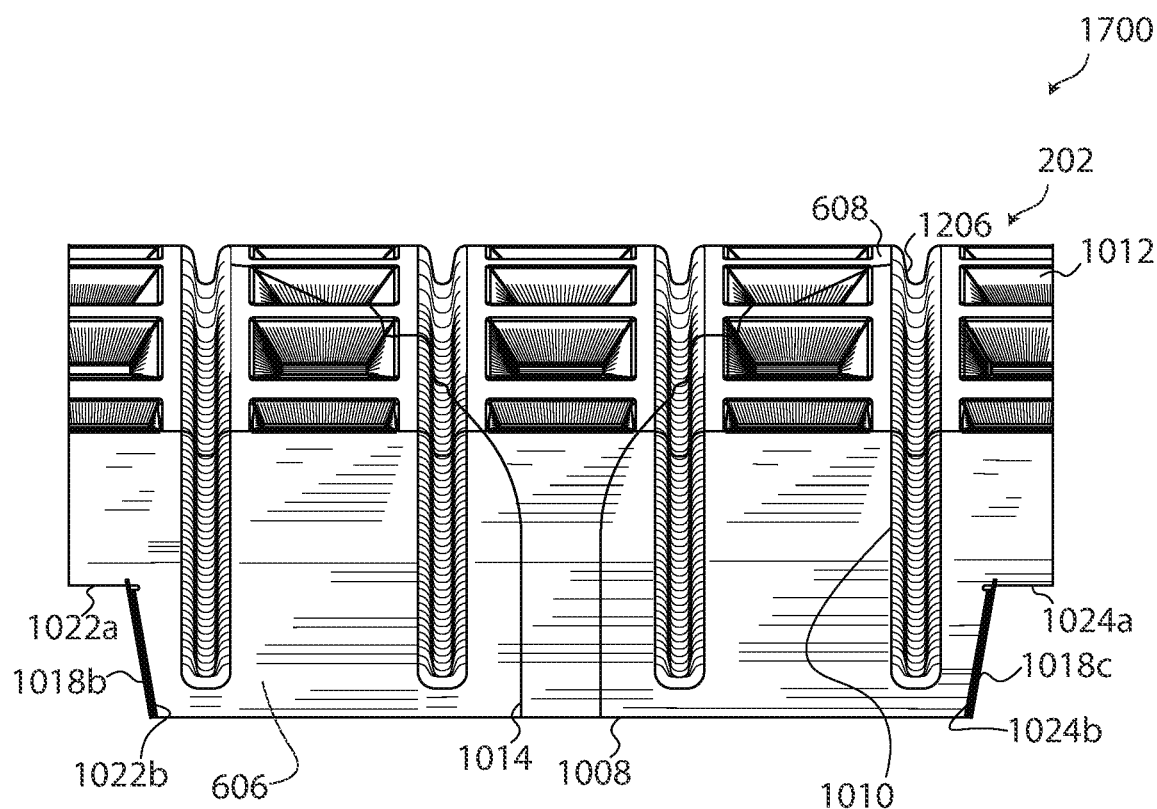
FIG. 17 illustrates a right-side view of the utility partition device in the open flap arrangement of FIG. 13.

In an illustrative configuration, FIG. 14 illustrates a perspective view 1400 of the utility partition device 202 in an open flap arrangement, FIG. 15 illustrates a front view 1500 of the utility partition device 202 in the open flap arrangement, FIG. 16 illustrates a left-side view 1600 of the utility partition device 202 in the open flap arrangement, and FIG. 17 illustrates a right-side view of the utility partition device 202 in the open flap arrangement.

To attain the open flap arrangement, the one or more flap portions 1018*a*, 1018*b*, 1018*c*, and 1018*d* may be opened, or rotated about their respective folding edges 1020*b*, 1022*b*, 1024*b*, and 1026*b*, up to a predefined angle, ranging between 0°-90° with respect to the first wall 604 and the second wall 606. As seen in FIGS. 14-17, the one or more flap portions 1018*a*, 1018*b*, 1018*c*, and 1018*d* after being rotated, may be transverse about the first wall 604 and the 606. For example, when the flap portion 1018*a* may be rotated about the folding edge 1020*b* up to the predefined angle, it may be illustrated that the flap portion 1018*a* appears to be transversely positioned about the first wall 604. Similarly, when the flap portion 1018*b* may be rotated about the folding edge 1022*b* up to the predefined angle, it may be illustrated that the flap portion 1018*b* appears to be transversely positioned about the second wall 606. Furthermore, when the flap portion 1018*c* may be rotated about the folding edge 1024*b*, and the flap portion 1018*d* may be rotated about the folding edge 1026*b*, it may be seen that the flap portion 1018*c* and the flap portion 1018*d* may appear to be transversely positioned about the second wall 606 and the first wall 604 respectively.

In an illustrative configuration, the open flap arrangement may be preferred when the utility partition device 202 may be installed perpendicular to the joists 106 (illustrated by FIG. 7). In such arrangement, the one or more flap portions 1018*a*, 1018*b*, 1018*c*, and 1018*d* may be affixed to the joists 106, such that the utility partition device 202 may be supported between two successive joists 106. The one or more flap portions 1018*a*, 1018*b*, 1018*c*, and 1018*d* may be affixed to the joists 106 using any fastening methods commonly known in the art.

In an illustrative configuration, during the installation of the utility partition system 104 in the ceiling frame 102, the utility partition device 202 may be fixated in at least one of the open flap arrangement, and the closed flap arrangement in the joists 106. Therefore, in cases where one or more utility partition devices 202 may be fixated in both the open flap arrangement and the closed flap arrangement (illustrated by FIG. 5), the utility partition devices 202 may be arranged perpendicularly. For example, with reference to FIG. 5, the utility partition device 202a may be arranged perpendicular to the utility partition device 202b. Such arrangement may be achieved by configuring either the utility partition device 202a or the utility partition device 202b in a cut configuration. The cut configuration is illustrated in detail, in conjunction with FIGS. 18-20.

Figure 18:
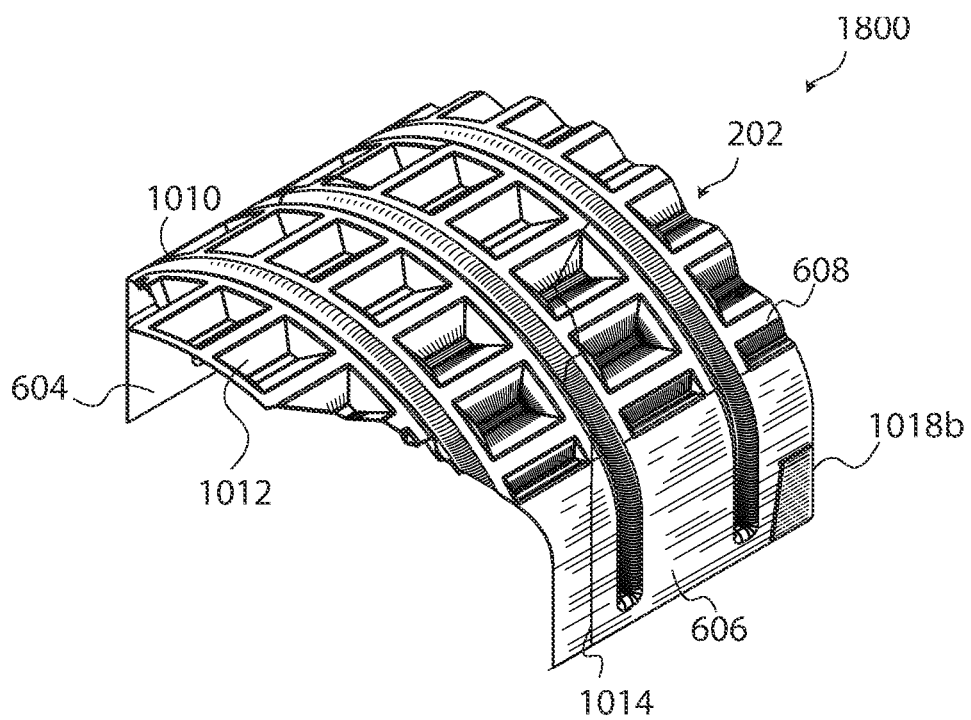
FIG. 18 illustrates a perspective view of the utility partition device in a cut configuration.
Figure 19:
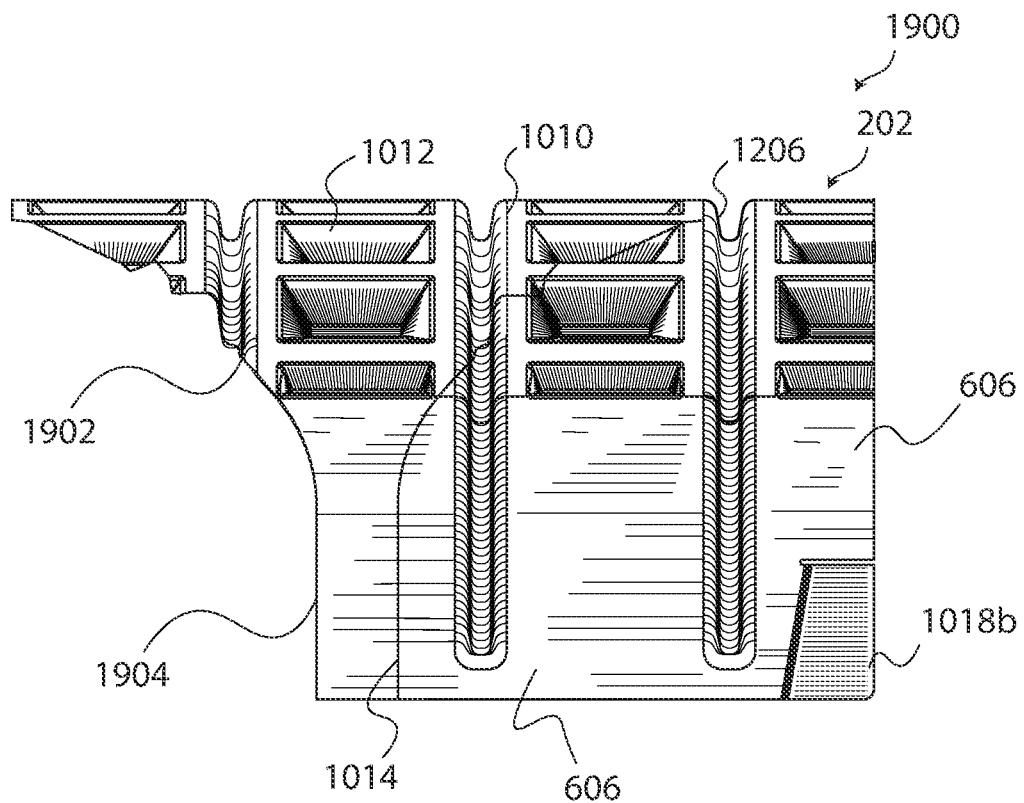
FIG. 19 illustrates a side view of the utility partition device in the cut configuration.
Figure 20:
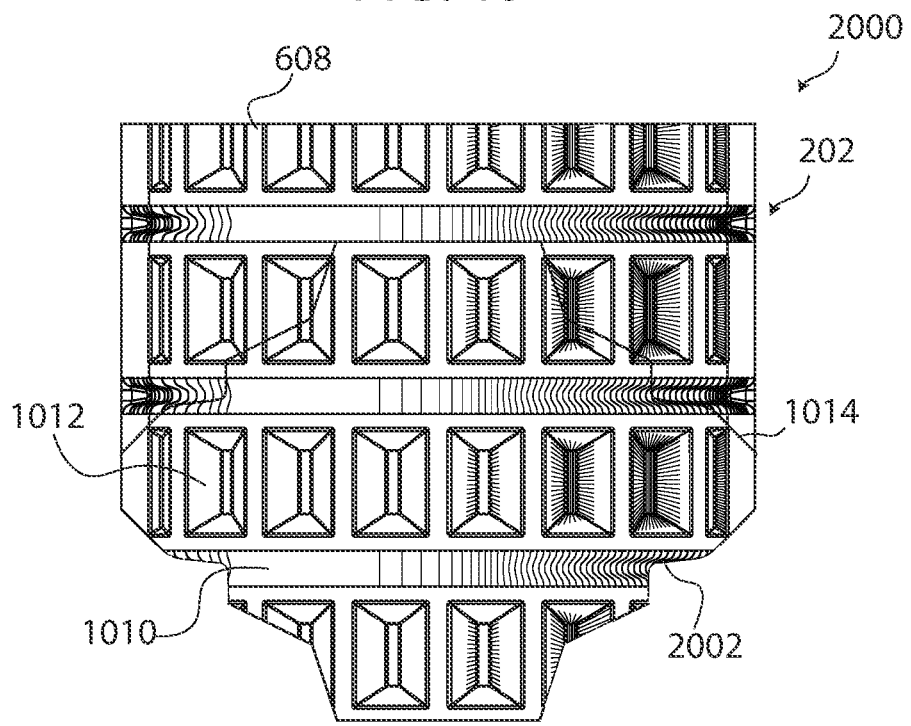
FIG. 20 illustrates a top view of the utility partition device in the cut configuration.

In an illustrative configuration, FIG. 18 illustrates a perspective view 1800 of the utility partition device in a cut configuration, FIG. 19 illustrates a side view 1900 of the utility partition device in the cut configuration, and FIG. 20 illustrates a top view 2000 of the utility partition device in the cut configuration.

In an illustrative configuration, with reference to FIGS. 18-20, the cut configuration of the utility partition device 202 may be obtained by cutting the utility partition device 202 along the one or more cutting guides 1014. The utility partition device 202 may be cut along the one or more cutting guides 1014 using any cutting device known in the art. After being cut, the lateral edges of the utility partition device 202 may be formed in a shape corresponding to the shape of the successive utility partition device 202.

As explained earlier, after being cut from the first wall 604 to the second wall 606, the lateral edges of the utility partition device 202 may be formed in a shape corresponding to the shape of the successive utility partition device 202. In an illustrative configuration, referring to FIGS. 19-20, the utility partition device 202 in the cut configuration may include a curved cut portion 1902 and a planar cut portion 1904. The curved cut portion 1902 may be congruent to the curved portion of the impervious segment 608 and the planar cut portion 1904 may be congruent to the shape of the first wall 604 and the second wall 606.

In an illustrative configuration, with continued reference to FIG. 20, when the utility partition device 202 in the cut configuration is viewed from the top, the utility partition device 202 may be formed as a V-shape structure 2002. Accordingly, the V-shaped structure 2002, along with the curved cut portion 1902 and the planar cut portion 1904 may enable adjoining of the utility partition device 202 in the cut configuration with another utility partition device 202. Moreover, the utility partition device 202 in the cut configuration may overlap sideways with another utility partition device 202 to form an L-shaped or T-shaped arrangement of the utility partition system 104.

In addition to the adjoining arrangement, the one or more utility partition devices 202 may also be arranged in a linear arrangement. In the linear arrangement, the one or more utility partition devices 202 may be linearly overlapped. The linear arrangement and the adjoined arrangement are explained in conjunction with FIGS. 21-24.

Figure 21:
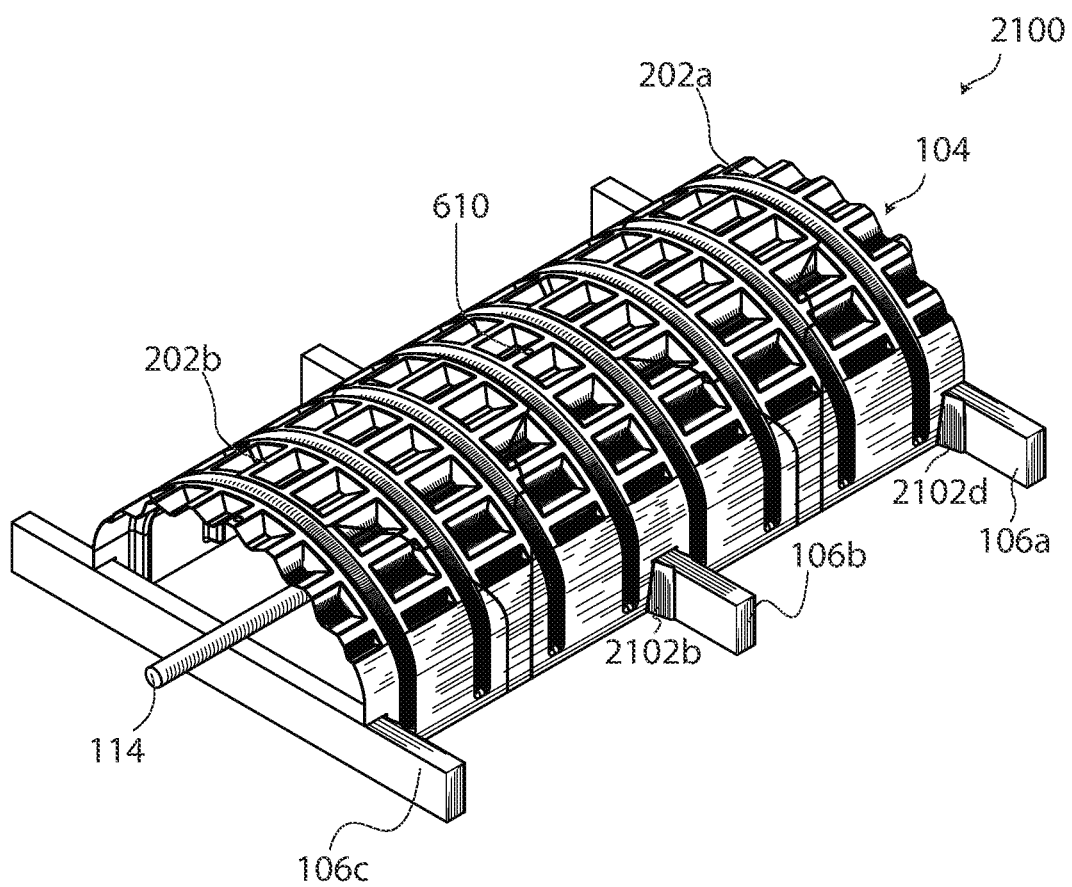
FIG. 21 illustrates a perspective view of the utility partition system in a linear arrangement.
Figure 22:
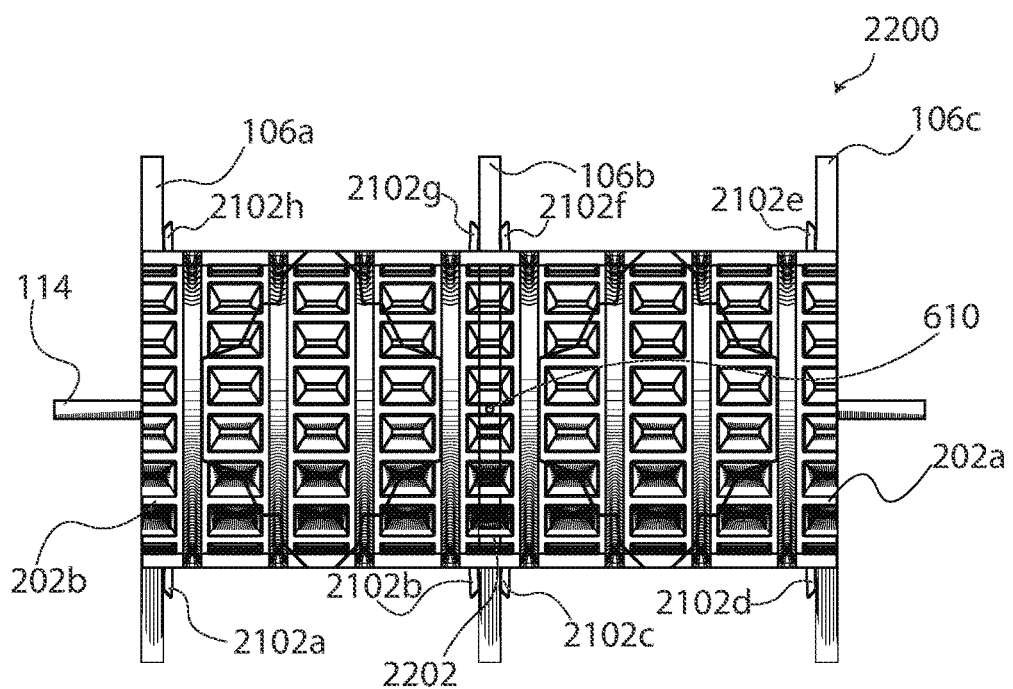
FIG. 22 illustrates a top view of the utility partition system in the linear arrangement.
Figure 23:
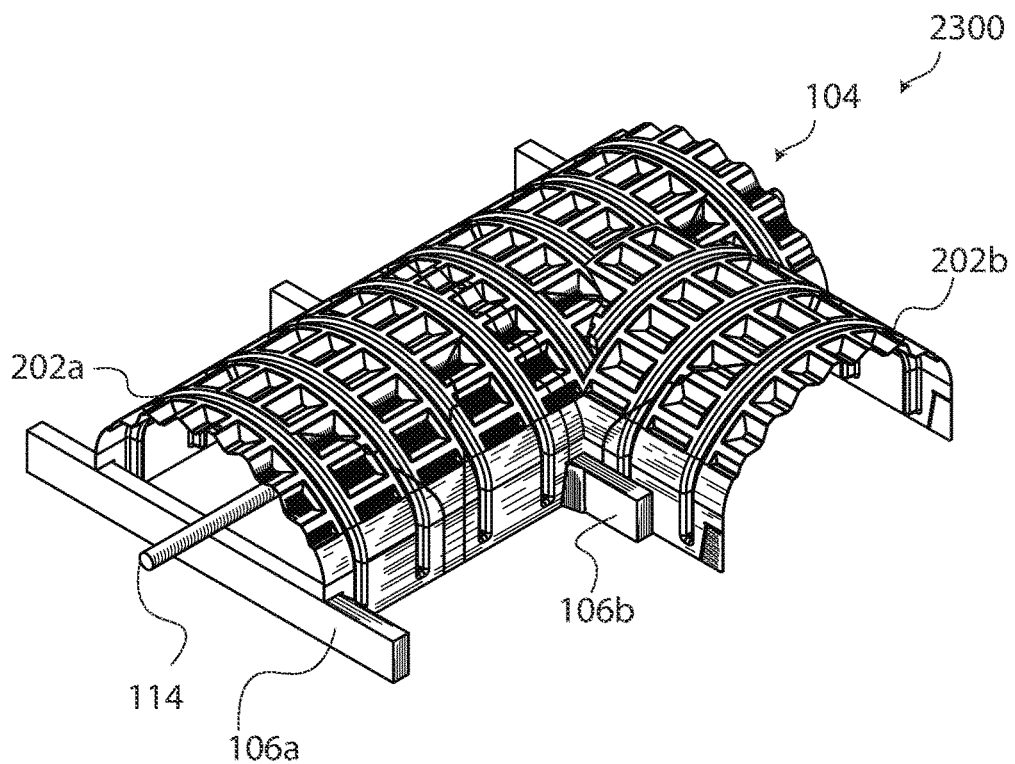
FIG. 23 illustrates a perspective view of the utility partition system in an adjoined arrangement.
Figure 24:
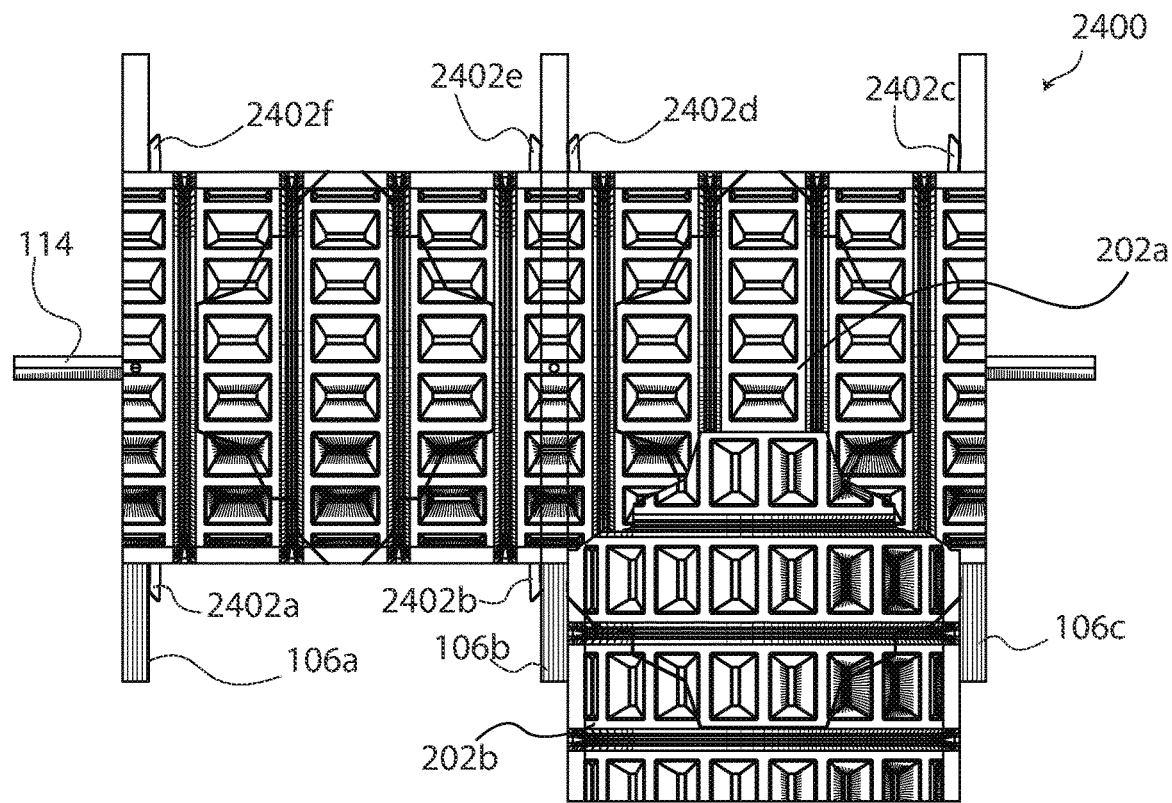
FIG. 24 illustrates a top view of the utility partition system in the adjoined arrangement.

In an illustrative configuration, FIG. 21 illustrates a perspective view 2100 of the one or more utility partition devices 202 in a linear arrangement, FIG. 22 illustrates a top view 2200 of the one or more utility partition devices 202 in the linear arrangement, FIG. 23 illustrates a perspective view 2300 the one or more utility partition devices 202 in an adjoined arrangement, and FIG. 24 illustrates a top view 2400 of the one or more utility partition devices 202 in the adjoined arrangement.

In an illustrative configuration, with continued reference to FIGS. 21-22, the one or more utility partition devices 202 may be arranged in a linear arrangement. In the linear arrangement, each utility partition device 202 may be overlapped on a consecutive utility partition device 202 linearly, in-line with the joists 106, or perpendicular to the joists 106. For example, referring to FIGS. 21-22, it may be seen that the utility partition device 202a and the utility partition device 202b may be fixated perpendicular to the joists 106. Therefore, the flap portions 2102a, 2102b . . . 2102h (similar to flap portions 1018a, 1018b, 1018c, and 1018d) may be arranged in an open flap arrangement and adjoined to the joists 106. Furthermore, the utility partition device 202a may overlap the utility partition device 202b up to a predefined overlapping portion 2202.

In an illustrative configuration, with continued reference to FIGS. 23-24, the utility partition system 104 may be arranged in an adjoined arrangement. The adjoined arrangement may be formed by adjoining one or more utility partitions 202, in which at least one utility partition device 202 may be in cut configuration. For example, the utility partition system 104 is illustrated in FIGS. 23-24 may include the first utility partition device 202a overlapping and adjoining perpendicularly the section utility partition device 202b. The second utility partition device 202b herein may be configured in the cut configuration (refer to FIG. 19) and may be overlapped perpendicularly to the first utility partition device 202a. Accordingly, the first utility partition device 202a may be cut at the portion at which the second utility partition device 202b may be overlapped. Therefore, the utility corridor 602 may be maintained between the first utility partition device 202a and the section utility partition device 202b in the adjoined arrangement.

In an illustrative configuration, the one or more utility partition devices 202 may be configured in the adjoined arrangement to adjoin utility partition devices 202 having separate flap arrangements, i.e., the open flap arrangement and the closed flap arrangement. Again, referring to FIGS. 23-24, it may be seen that the second utility partition device 202b may be adjoined to the joists 106 in a closed flap arrangement, and the first utility partition device 202a may be adjoined to the joists 106 in the open flap arrangement. Hence, the second utility partition device 202b may be affixed in-line to the joists 106, and the first utility partition device 202a may be fixed perpendicular to the joists 106, as the flap portions 2402a, 2402b . . . 2402f (similar to the flap portions 1018a, 1018b, 1018c, and 1018d) of the first utility partition device 202a may be adjoined to the joists 106 in the open flap arrangement. Accordingly, as explained earlier, in the adjoined arrangement, the second utility partition device 202b in the cut configuration may be overlapped and adjoined perpendicular to the first utility partition device 202a. Such perpendicular arrangement in the adjoined arrangement may enable the adjoining of the utility partition devices 202 having separate flap arrangements.

Depending on the type of the utility 114 to be bifurcated from the ceiling cavity 112 or vice versa, the one or more utility partition device 202 of the utility partition system 104 may be affixed to the ceiling frame 102 in at least one of the linear arrangement, or the adjoined arrangement, or both. Such arrangement is explained in detail in conjunction with FIGS. 25-27.

Figure 25:
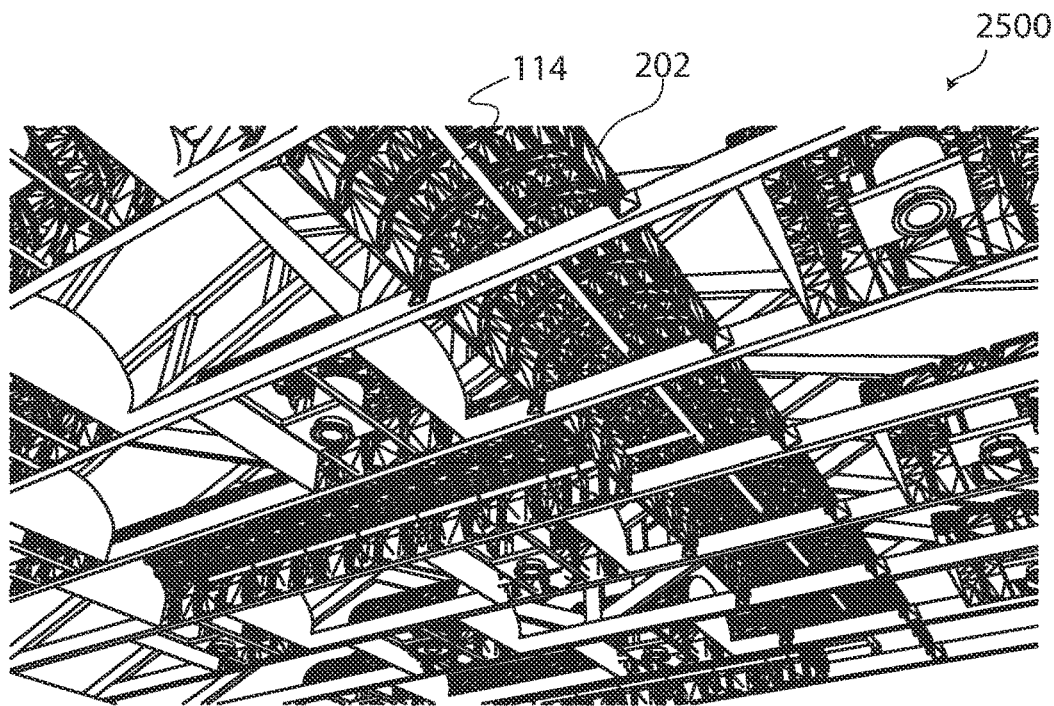
FIG. 25 illustrates a bottom perspective view of the ceiling frame.
Figure 26:
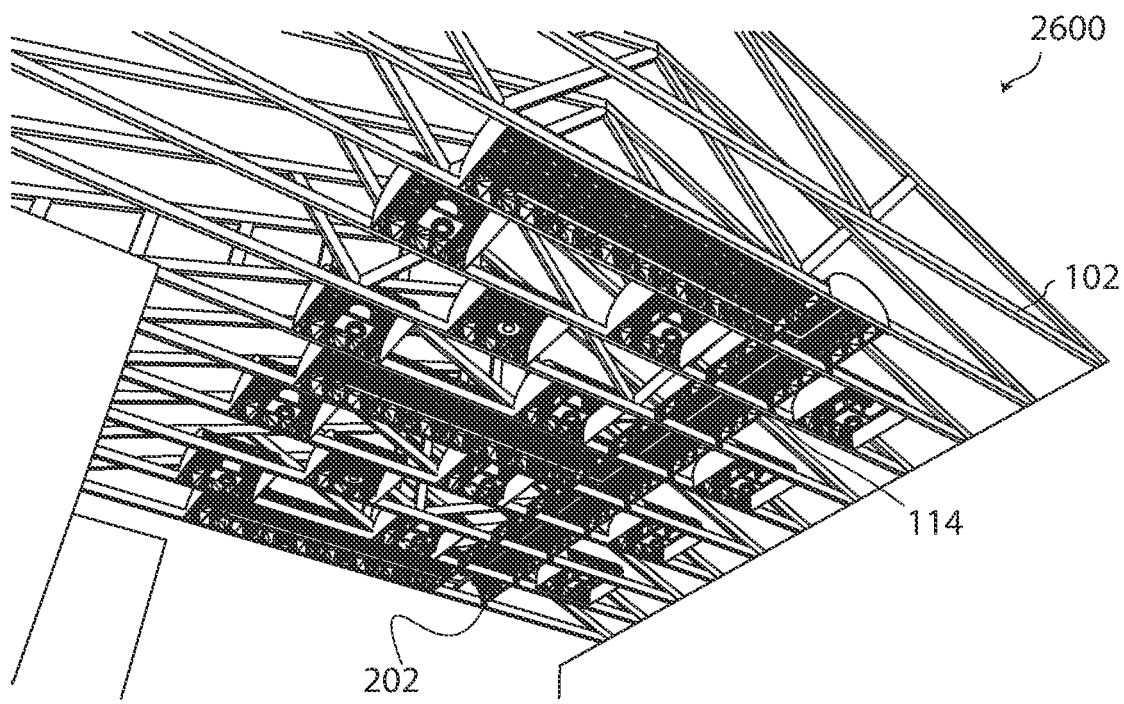
FIG. 26 illustrates another bottom-perspective view of the ceiling frame.
Figure 27:
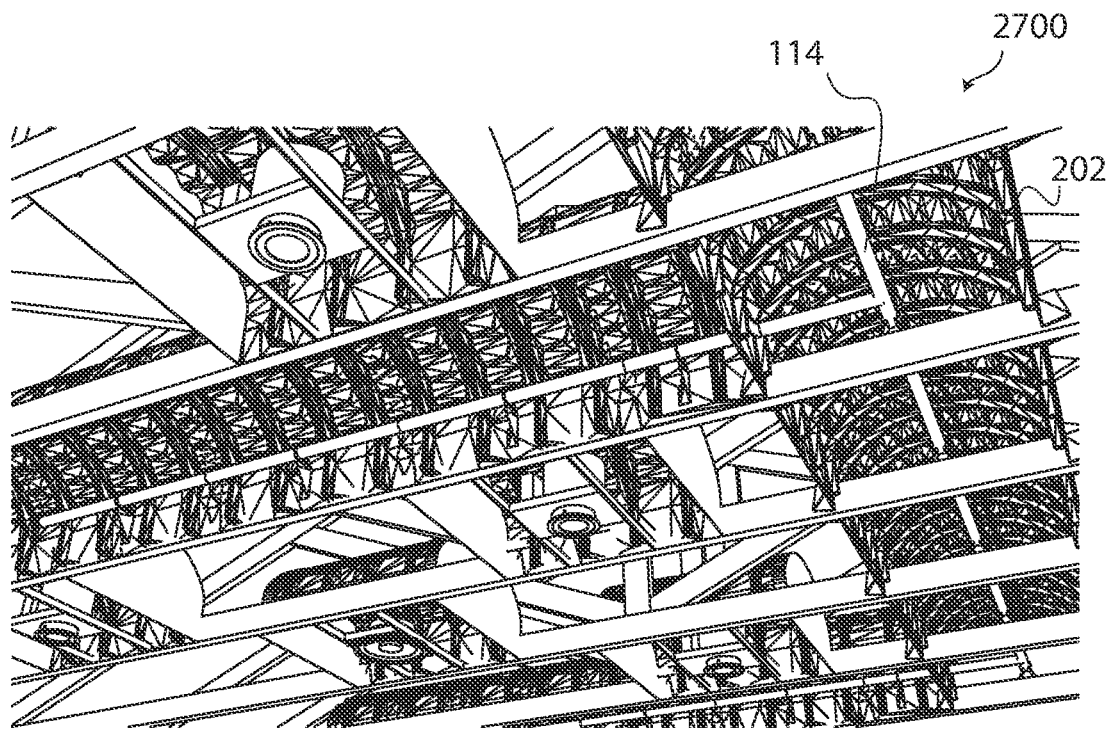
FIG. 27 illustrates another bottom-perspective view of the ceiling frame.

In an illustrative configuration, FIG. 25 illustrates a bottom perspective view 2500 of the ceiling frame 102, FIG. 26 illustrates another bottom perspective view 2600 of the ceiling frame 102, and FIG. 27 illustrates another bottom perspective view 2700 of the ceiling frame 102.

The utility partition device 202 of utility partition system 104, as explained earlier, may be arranged in the linear arrangement or the adjoined arrangement on the ceiling frame 102. Particularly, the one or more utility partition devices 202 may be adjoined in the linear arrangement or in the adjoined arrangement, or both, to bifurcate the ceiling cavity 112 from the utility 114. For example, referring to FIG. 25, the utility partition device 202 may be arranged in the adjoined arrangement, and referring to FIGS. 26-27, the one or more utility partition devices 202 may be arranged in both the linear arrangement and the adjoined arrangement to bifurcate the ceiling cavity 112 from the utility 114.

The linear arrangement or the adjoined arrangement may also be selected based on the type of utility 114 to be bifurcated from the ceiling cavity. For example, if the one or more utility 114 such as the fire sprinkler pipe is to be bifurcated from the ceiling cavity, then an adjoined arrangement of the utility partition device 202 may be preferred, to bifurcate perpendicular branches of the fire sprinkler pipe. If the utility 114 such as an array of ceiling lamps is to be bifurcated from the ceiling cavity, a linear arrangement may be preferred.

Figure 28:
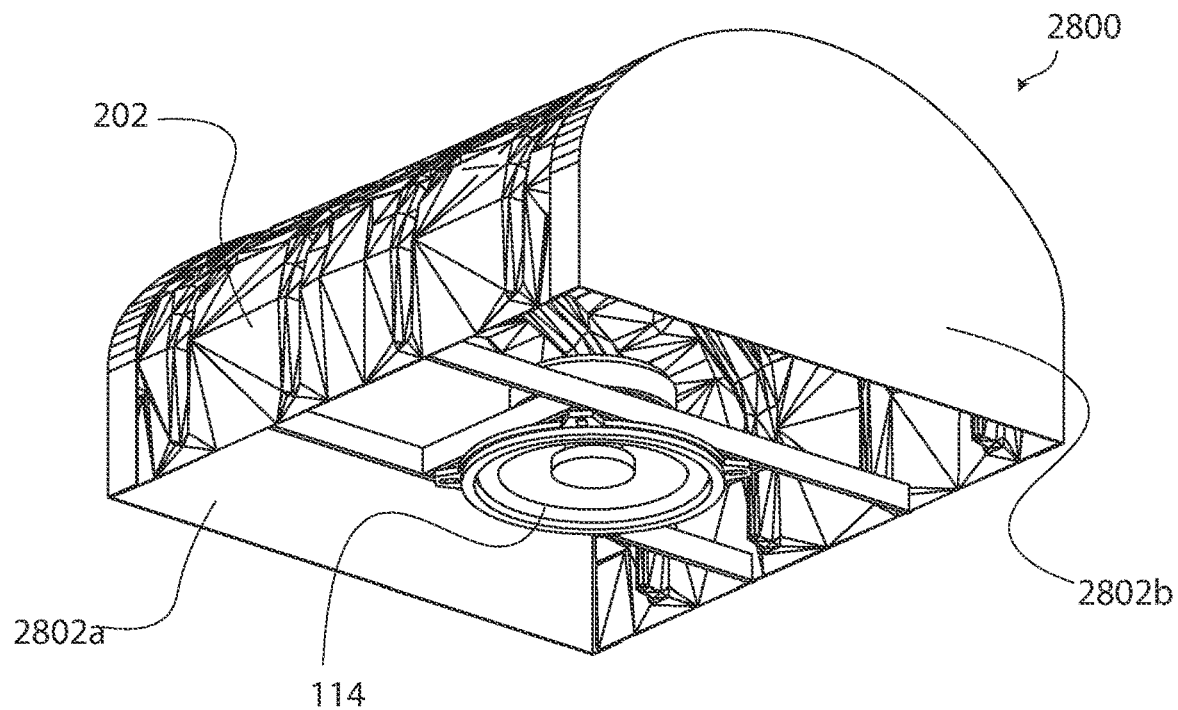
FIG. 28 illustrates a bottom perspective view of the utility partition.
Figure 29:
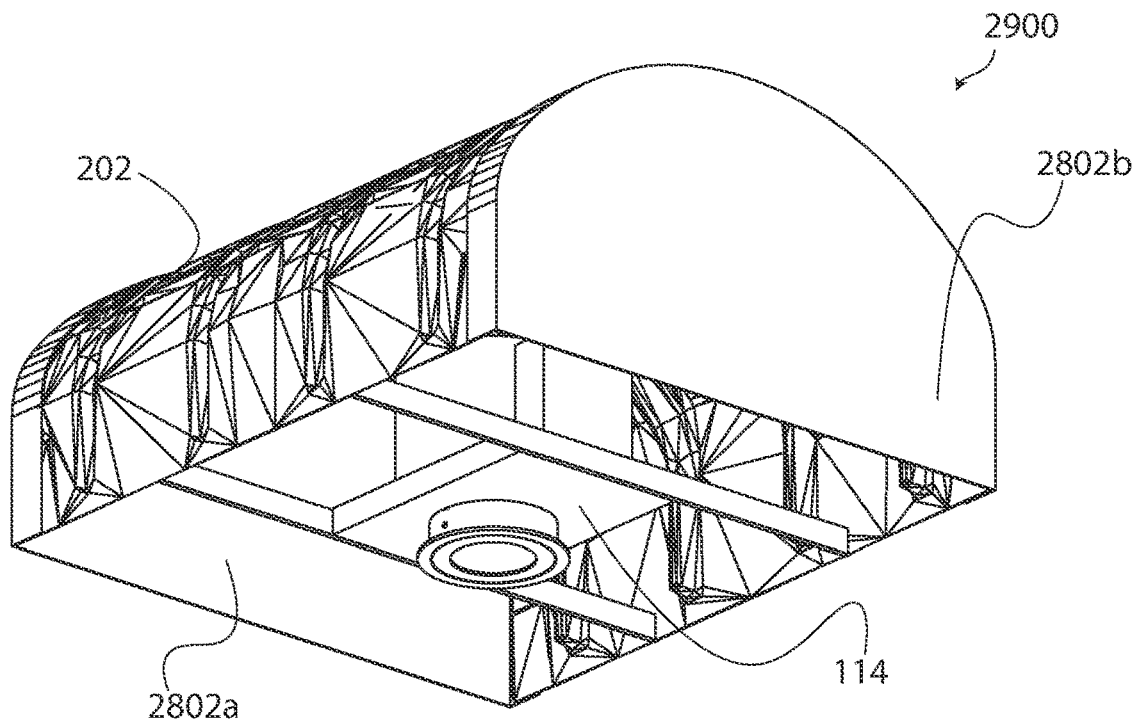
FIG. 29 illustrates a bottom perspective view of another utility partition.
Figure 30:
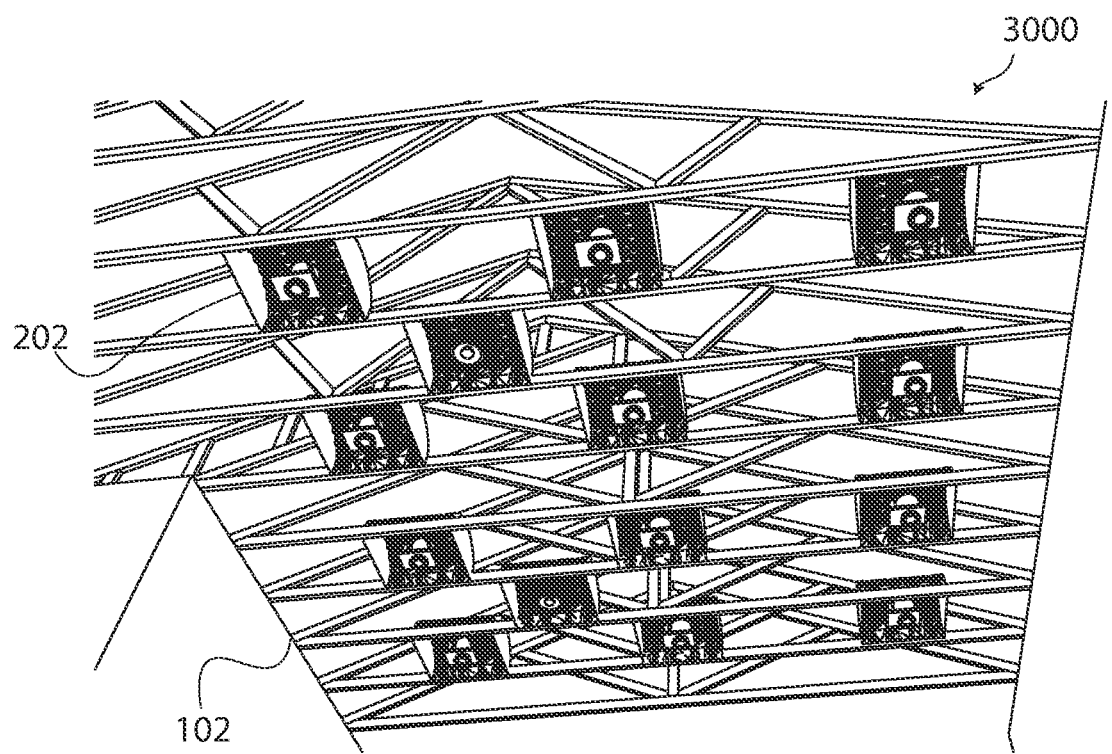
FIG. 30 illustrates another bottom-perspective view of the ceiling frame.

In an alternative configuration, FIG. 28 illustrates a bottom perspective view 2800 of the utility partition device 202 with an audio speaker, FIG. 29 illustrates a bottom perspective view 2900 of the utility partition device 202 with an illumination system, and FIG. 30 illustrates a bottom perspective view 3000 of the ceiling frame 102 with various utilities.

In an alternative configuration, the utility partition system 104 may include a single utility partition device 202 in a standalone arrangement. The standalone arrangement may be selected to bifurcate the ceiling cavity 112 from the single utility 114 such as but not limited to a single utility lamp, or a speaker of an audio system. For example, referring to FIG. 28, the utility 114 may include a speaker of an audio system, and also referring to FIG. 29, the utility 114 being a single ceiling lamp, only a standalone utility partition device 202 may be used to bifurcate ceiling cavity 112 from the utility 114, thereby representing standalone arrangement. Accordingly, multiple standalone utility partition devices 202 may be arranged in the standalone arrangement on the ceiling frame 102.

In an alternative configuration, with continued reference to FIGS. 28-30, each standalone utility partition device 202 may include a first cap 2802a and a second cap 2802b. The first cap 2802a and the second cap 2802b may be configured to cover the standalone utility partition device 202. In another alternative configuration, each of the first cap 2802a and the second cap 2802b may be designed similarly to the structure of the standalone utility partition device 202. While assembling the standalone utility partition device 202 on the ceiling frame 102, each of the first cap 2802a and the second cap 2802b may be press-fitted, fastened, and/or adhered to the standalone utility partition device 202. Consequently, the standalone utility partition device 202 may be covered, and therefore, the insulation material may be prevented from rolling over the one or more utility 114. In an alternative configuration, the first cap 2802a and the second cap 2802b may also be fixated at respective ends of the utility partition system 104, especially in the linear arrangement, or adjoined arrangement as disclosed in FIGS. 1-2, and FIGS. 25-27.

Figure 31:
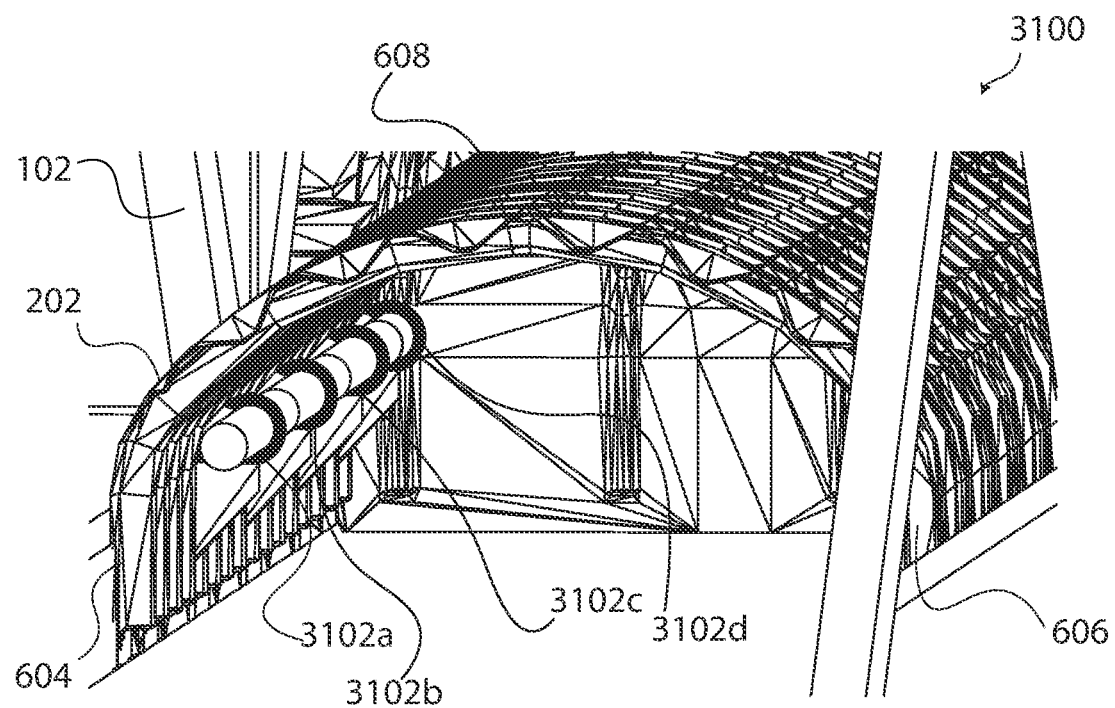
FIG. 31 illustrates a front-perspective view of the utility partition.

In an alternative configuration, now referring to FIG. 31, which illustrates a front perspective view 3100 of the utility partition device 202. The utility partition system 104 may accommodate one or more offset mounting brackets 3102a, 3102b, 3102c, and 3102d (hereinafter referred to as offset mounting brackets 3102). The offset mounting brackets 3102 may be formed, or affixed on at least one of the first wall 604, the second wall 606, and the impervious segment 608, and may enter the utility corridor 602 though the first wall 604, or the second wall 606. In an alternative configuration, the first wall 604 and the second wall 606 may include one or more bracket grooves (not shown in figure), through which the offset mounting brackets 3102 may enter the utility corridor 602 from the first wall 604 or the second wall 606. The offset mounting brackets 3102 may be configured to accommodate and hold utilities 114 such as but not limited to fire sprinkler pipes, wiring assembly, for electrical systems, and the like. Additionally, an extra space for other utilities 114 such as fire sprinkler pipes may be facilitated as the wiring assembly or similar utilities may be accommodated within the ring 3102.

Figure 32:
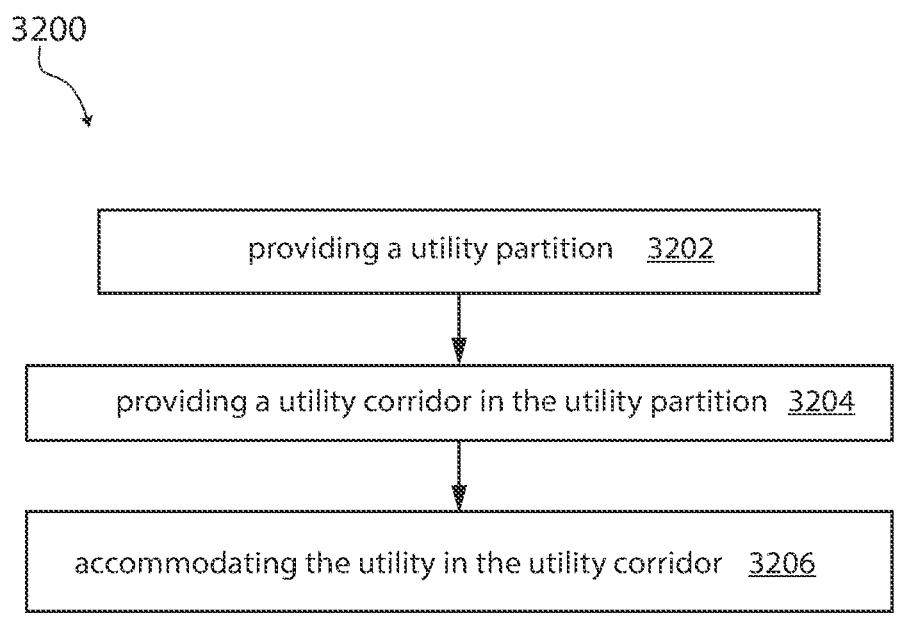
FIG. 32 illustrates a flowchart of a bifurcation method.

In one illustrative configuration, FIG. 32 illustrates a flowchart 3200 of a bifurcation method for bifurcating a ceiling cavity 112 from a utility 114. The utility partition device 202 may bifurcate the ceiling cavity 112 from the utility 114, by preventing the insulation material present in the ceiling cavity 112 from rolling onto the utility 114.

At step 3202, a utility partition device 202 may be provided. The utility partition 202 may include a first wall 604. The first wall may further include a first wall proximal edge 1002, and a first wall distal edge 1004 oppositely disposed to the first wall proximal edge 1002 by a first predefined height h. The utility partition device 202 may further include a second wall 606 symmetrical to and offset from, the first wall 604 by a predefined distance. The second wall may include a second wall proximal edge 1006, and a second wall distal edge 1008 oppositely disposed to the second wall proximal edge 1006 by a second predefined height h. Further, the utility partition device 202 may include an impervious segment 608 disposed between the first wall proximal edge 1002 to the second wall proximal edge 1006.

At step 3204, a utility corridor 602 may be provided. The utility corridor 602 may be separated from the ceiling cavity 112 by the impervious segment 608, and collectively formed by the first wall 604, the second wall 606, and the impervious segment 608. Particularly, the first wall 604, the second wall 606, and the impervious segment 608 may form a curved shape, such as for example, an arc or a semicircular shape. The curved shape may include a cavity, which may represent the utility corridor 602.

At step 3206, the ceiling cavity 112 may be bifurcated from the one or more utility 114 by accommodating the utility 114 in the utility corridor 602. As the one or more utility 114 may be accommodated in the utility corridor 602, the rolling over of the insulation on the one or more utility 114 may be prevented accordingly.

As used herein, including in the claims, "and" as used in a list of items prefaced by "at least one of" or "at least one of" indicates that any combination of the listed items may be used. For example, a list of "at least one of A, B, and C" includes any of the combinations A or B or C or AB or AC or BC and/or ABC (i.e., A and B and C). Furthermore, to the extent that more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred configurations of the disclosed systems, methods and/or machine-readable media have been described in detail herein, it is to be understood that the inventive concepts may be otherwise variously embodied and employed and that the appended claims are intended to be construed to include such variations except as limited by the prior art. While the principles of the disclosure have been described above in connection with specific apparatuses and methods, it is to be clearly understood that this description is made only by way of example and not as limitation on the scope of the disclosure.

What is claimed is:

1. A utility partition to bifurcate a ceiling cavity from a utility, the utility partition comprising:
 a first wall, comprising:
  a first wall proximal edge; and
  a first wall distal edge oppositely disposed to the first wall proximal edge by a first predefined height;
 a second wall symmetrical to, and offset from, the first wall by a predefined distance, the second wall comprising:
  a second wall proximal edge; and
  a second wall distal edge oppositely disposed to the second wall proximal edge by a second predefined height;
 an impervious segment disposed between the first wall proximal edge to the second wall proximal edge,
  wherein the first wall, the second wall, and the impervious segment collectively form:
   a utility corridor separated from the ceiling cavity, the utility corridor configured to accommodate the utility
 a first slit transpose to the first wall distal edge, the first slit comprising:
  a first end; and
  a second end;
 a first folding edge connecting the first end and the first wall distal edge, wherein the first folding edge is formed at a predefined angle from the first wall distal edge; and
 a first flap formed by a portion of the first wall disposed between the first slit and the first folding edge, wherein the first flap is foldable about the first folding edge.

2. The utility partition of claim 1, wherein the utility corridor is configured to receive the utility comprising at least of:
 a fire sprinkler,
 a ceiling lamp, and
 a wiring assembly.

3. The utility partition of claim 1, wherein the impervious segment further comprises:
 an arc disposed between the first wall and the second wall, wherein the arc comprises:
  at least one hoisting groove.

4. The utility partition of claim 1, wherein the impervious segment further comprises:
 a first rib;
 a second rib separated from the first rib by a predefined gap;
 wherein each rib comprises:
  an interlock structure configured to engage the first rib with the second rib; and
 a stacked arrangement, comprising:
  at least one utility partition device stacked together, wherein the second rib of one utility partition device is stacked and interlocked within the first rib of a sequential utility partition device via the interlock structure.

5. The utility partition of claim 4, wherein the impervious segment further comprises:
 a plurality of sequential ribs formed between the first rib and the second rib.

6. The utility partition of claim 4, wherein the impervious segment further comprises:
 at least one insulation pocket between the first wall distal edge and the second wall distal edge.

7. The utility partition of claim 6 wherein the at least one insulation pocket comprises:
 a trapezoidal shape.

8. The utility partition of claim 1 and further comprising:
 a cutting guide formed in at least one of:
  the first wall,
  the second wall, and
  the impervious segment.

9. The utility partition of claim 1, wherein the first wall comprises:
 a second slit transpose to the first wall distal edge, the second slit comprising:
  a first end; and
  a second end;
 a second folding edge connecting the first end and the first wall distal edge, wherein the second folding edge is formed at a predefined angle from the first wall distal edge; and
 a second flap formed by a portion of the first wall disposed between the second slit and the second folding edge, wherein the second flap is foldable about the second folding edge.

10. The utility partition of claim 9, wherein the second wall comprises:
 a first slit transpose to the second wall distal edge, the first slit comprising:
  a first end; and
  a second end;
 a first folding edge connecting the first end and the second wall distal edge, wherein the first folding edge is formed at a predefined angle from the second wall distal edge;
 a first flap formed by a portion of the second wall disposed between the first slit and the first folding edge, wherein the first flap is foldable about the first folding edge;
 a second slit transpose to the second wall distal edge, the second slit comprising:
  a first end; and
  a second end;
 a second folding edge connecting the first end and the second wall distal edge, wherein the second folding edge is formed at a predefined angle from the second wall distal edge; and
 a second flap formed by a portion of the second wall disposed between the second slit and the second folding edge, wherein the second flap is foldable about the second folding edge.

11. A bifurcation method for bifurcating a ceiling cavity from a utility, the bifurcation method comprising:
 providing a utility partition, the utility partition comprising:
  a first wall, comprising:
   a first wall proximal edge; and
   a first wall distal edge oppositely disposed to the first wall proximal edge by a first predefined height;
  a second wall symmetrical to, and offset from, to the first wall by a predefined distance, the second wall comprising:
   a second wall proximal edge; and
   a second wall distal edge oppositely disposed to the second wall proximal edge by a second predefined height; and
  an impervious segment between the first wall proximal edge to the second wall proximal edge;
 providing a utility corridor separated from the ceiling cavity and collectively formed by the first wall, the second wall, and the impervious segment; and
 accommodating the utility in the utility corridor;

the impervious segment further comprising:
an arc disposed between the first wall and the second wall, wherein the arc comprises:
at least one hoisting groove;
a first rib;
a second rib separated from the first rib by a predefined gap;
wherein each rib comprises:
an interlock structure configured to engage the first rib with the second rib; and
a plurality of sequential ribs formed between the first rib and the second rib;
stacking collectively, at least one utility partition device in a stacked arrangement, wherein the second rib of one utility partition device is stacked and interlocked within the first rib of a sequential utility partition device via the interlock structure.

12. The bifurcation method of claim 11, wherein accommodating the utility in the utility corridor further comprises:
the utility corridor comprising at least of:
a fire sprinkler,
a ceiling lamp, and
a wiring assembly.

13. The bifurcation method of claim 11, and further comprising:
the impervious segment further comprising:
at least one insulation pocket between the first wall distal edge and the second wall distal edge, each insulation pocket comprising:
a trapezoidal shape.

14. The bifurcation method of claim 11, wherein providing the utility partition further comprising:
providing a cutting guide formed in at least one of:
the first wall,
the second wall, and
the impervious segment.

15. The bifurcation method of claim 11, wherein providing the utility partition further comprises:
the first wall comprising:
a first slit transpose to the first wall distal edge, the first slit comprising:
a first end; and
a second end;
a first folding edge connecting the first end and the first wall distal edge, wherein the first folding edge is formed at a predefined angle from the first wall distal edge; and
a first flap formed by a portion of the first wall disposed between the first slit and the first folding edge, wherein the first flap is foldable about the first folding edge;
a second slit transpose to the first wall distal edge, the second slit comprising:
a first end; and
a second end;
a second folding edge connecting the first end and the first wall distal edge, wherein the second folding edge is formed at a predefined angle from the first wall distal edge; and
a second flap formed by a portion of the first wall disposed between the second slit and the second folding edge, wherein the second flap is foldable about the second folding edge.

16. The bifurcation method of claim 11, wherein providing the utility partition further comprises:
the second wall comprising:
a first slit transpose to the second wall distal edge, the first slit comprising:
a first end; and
a second end;
a first folding edge connecting the first end and the second wall distal edge, wherein the first folding edge is formed at a predefined angle from the second wall distal edge;
a first flap formed by a portion of the second wall disposed between the first slit and the first folding edge, wherein the first flap is foldable about the first folding edge;
a second slit transpose to the second wall distal edge, the second slit comprising:
a first end; and
a second end;
a second folding edge connecting the first end and the second wall distal edge, wherein the second folding edge is formed at a predefined angle from the second wall distal edge; and
a second flap formed by a portion of the second wall disposed between the second slit and the second folding edge, wherein the second flap is foldable about the second folding edge.

17. A utility partition system to bifurcate a ceiling cavity from a utility, the utility partition system comprising:
a first utility partition, comprising:
first utility partition first wall;
a first utility partition second wall arranged symmetrical and offset to the first wall by a predefined distance;
an impervious segment disposed between the first wall and the second wall; at least one insulation pocket; and
a cutting guide formed on at least one of:
the first wall,
the second wall, and
the impervious segment;
a second utility partition, comprising:
a second utility partition first wall;
a second utility partition second wall arranged symmetrical and offset to the first wall by a predefined distance;
an impervious segment disposed between the first wall and the second wall; and
a cutting guide formed on at least one of:
the first wall,
the second wall, and
the impervious segment;
wherein each of the first utility partition and the second utility partition comprises:
a utility corridor separated from the ceiling cavity, the utility corridor configured to accommodate the utility;
a cut configuration, wherein the second utility partition is cut along the cutting guide such that the first wall, the second wall, and the impervious segment forms a shape corresponding to a shape of the first utility partition and the at least one insulation pocket; and
an adjoined configuration, wherein the second utility partition after being cut is adjoined to the first utility partition such that the second utility partition is perpendicular to the first utility partition.

18. The utility partition system of claim 17, wherein providing the first utility partition comprises:
the first wall, comprising:
a first wall proximal edge; and
a first wall distal edge oppositely disposed to the first wall proximal edge by a first predefined height; and
the second wall, comprising:
a second wall proximal edge; and
a second wall distal edge oppositely disposed to the first wall proximal edge by a first predefined height.

19. The utility partition system of claim 17, wherein providing the second utility partition comprises:
the first wall, comprising:
a first wall proximal edge; and
a first wall distal edge oppositely disposed to the first wall proximal edge by a first predefined height; and
the second wall, comprising:
a second wall proximal edge; and
a second wall distal edge oppositely disposed to the first wall proximal edge by a first predefined height.

20. The utility partition system of claim 17, wherein the impervious segment further comprises:
an arc disposed between the first wall and the second wall wherein the arc comprises:
at least one hoisting groove.

21. The utility partition system of claim 17, wherein the impervious segment further comprises:
a first rib;
a second rib separated from the first rib by a predefined gap;
wherein each rib comprises:
an interlock structure configured to engage the first rib with the second rib; and
a stacked arrangement, comprising:
at least one utility partition device stacked together, wherein the second rib of one utility partition device is stacked and interlocked within the first rib of a sequential utility partition device via the interlock structure.

22. The utility partition system of claim 21, wherein the impervious segment further comprises:
a plurality of sequential ribs formed between the first rib and the second rib.

23. The utility partition system of claim 17, wherein the at least one insulation pocket comprises:
a trapezoidal shape.

\* \* \* \* \*